(12) United States Patent
Khurana et al.

(10) Patent No.: US 12,553,819 B2
(45) Date of Patent: Feb. 17, 2026

(54) CELL SORTING AND SELECTION USING DEGRADABLE HYDROGELS

(71) Applicant: Cellanome, Inc., Foster City, CA (US)

(72) Inventors: Tarun Kumar Khurana, Fremont, CA (US); Meng Taing, Hayward, CA (US); Pier Federico Gherardini, Oakland, CA (US); Seyedsina Moeinzadeh, Mountain View, CA (US)

(73) Assignee: Cellanome, Inc.

( * ) Notice: Subject to any disclaimer, the term of this patent is extended or adjusted under 35 U.S.C. 154(b) by 0 days.

(21) Appl. No.: 18/974,436

(22) Filed: Dec. 9, 2024

(65) Prior Publication Data

US 2025/0102419 A1  Mar. 27, 2025

Related U.S. Application Data

(63) Continuation of application No. PCT/US2023/068154, filed on Jun. 8, 2023.
(Continued)

(51) Int. Cl.
 *G01N 15/149* (2024.01)
 *C12M 1/00* (2006.01)
(Continued)

(52) U.S. Cl.
 CPC ....... *G01N 15/149* (2024.01); *G01N 15/1436* (2013.01); *G01N 15/1459* (2013.01); *G01N 15/1484* (2013.01); *G01N 2015/1006* (2013.01)

(58) Field of Classification Search
 None
 See application file for complete search history.

(56) References Cited

U.S. PATENT DOCUMENTS 7,695,954 B2  4/2010  Bachman et al.
7,759,119 B2  7/2010  Allbritton et al.
(Continued)

FOREIGN PATENT DOCUMENTS

KR  20210103010 A  8/2021
WO  WO-2017075265 A1  5/2017
(Continued)

OTHER PUBLICATIONS

Oldenhof, S., Mytnyk, S., Arranja, A. et al. Imaging-assisted hydrogel formation for single cell isolation. Sci Rep 10, 6595 (2020) (Year: 2020).*
(Continued)

*Primary Examiner* — Elizabeth A Robinson
*Assistant Examiner* — Brittany I Fisher
(74) *Attorney, Agent, or Firm* — WILSON SONSINI GOODRICH & ROSATI

(57) ABSTRACT

Described herein are systems and methods for sorting and selecting cells by immobilizing or enclosing cells in degradable hydrogel chambers, including a method of sorting cells comprising: (a) providing a fluidics device comprising: (i) a channel comprising a surface, (ii) a spatial energy modulation element in optical communication with the surface, and (iii) a detector in optical communication with the surface and in operable association with the spatial energy modulating element, the detector identifying cells and determining positions thereof on the surface; (b) loading the channel with cells and one or more polymer precursors so that the cells are disposed on or adjacent to the surface; (c) immobilizing one or more cells selected based on one or more optical signals therefrom by synthesizing one or more gel structures enclosing each of the one or more cells by projecting light into the channel with the spatial energy modulating element such that the projected light causes
(Continued)

cross-linking of the one or more polymer precursors to form gel structures, wherein the positions of the gel structures in the channel are determined by the positions of the cells enclosed thereby identified by the detector; and (d) removing from the channel unselected cells.

25 Claims, 19 Drawing Sheets

Related U.S. Application Data

(60) Provisional application No. 63/350,813, filed on Jun. 9, 2022.

(51) Int. Cl.
| | |
|---|---|
| C12N 11/04 | (2006.01) |
| C12N 11/10 | (2006.01) |
| G01N 15/10 | (2024.01) |
| G01N 15/14 | (2024.01) |
| G01N 15/1434 | (2024.01) |
| G02B 21/06 | (2006.01) |
| G02B 26/08 | (2006.01) |

(56) References Cited

U.S. PATENT DOCUMENTS

| | | |
|---|---|---|
| 7,951,580 B2 | 5/2011 | Li et al. |
| 8,173,080 B2 | 5/2012 | Lebl et al. |
| 8,900,828 B2 | 12/2014 | Smith et al. |
| 8,921,073 B2 | 12/2014 | Reed et al. |
| 9,068,155 B2 | 6/2015 | Allbritton et al. |
| 9,487,745 B2 | 11/2016 | Wang et al. |
| 9,561,622 B2 | 2/2017 | Das et al. |
| 9,631,092 B2 | 4/2017 | Bowman et al. |
| 9,765,291 B2 | 9/2017 | Allbritton et al. |
| 9,963,666 B2 | 5/2018 | Allbritton et al. |
| 10,351,819 B2 | 7/2019 | Hribar et al. |
| 10,464,307 B2 | 11/2019 | Chung et al. |
| 11,046,926 B2 | 6/2021 | Allbritton et al. |
| 11,142,787 B2 | 10/2021 | Hosokawa et al. |
| 2008/0193536 A1 | 8/2008 | Khademhosseini et al. |
| 2014/0163736 A1 | 6/2014 | Azizian et al. |
| 2016/0177030 A1 | 6/2016 | Sugiura et al. |
| 2016/0208308 A1 | 7/2016 | Cohen et al. |
| 2018/0066299 A1* | 3/2018 | Kim .................. C12M 23/02 |
| 2018/0113114 A1 | 4/2018 | Lütolf et al. |
| 2019/0136170 A1 | 5/2019 | Allbritton et al. |
| 2019/0256817 A1 | 8/2019 | Gebhart et al. |
| 2020/0080046 A1 | 3/2020 | Gebhart et al. |
| 2020/0080060 A1* | 3/2020 | Matheu .............. C12N 5/0062 |
| 2020/0399428 A1 | 12/2020 | Kleine-Brüggeney et al. |
| 2022/0010367 A1* | 1/2022 | Ramachandran Iyer ................... C12N 15/1065 |
| 2022/0034867 A1 | 2/2022 | Butler et al. |
| 2022/0160445 A1 | 5/2022 | Meglan et al. |

FOREIGN PATENT DOCUMENTS

| | | |
|---|---|---|
| WO | WO-2017151582 A1 | 9/2017 |
| WO | WO-2018097950 A1 | 5/2018 |
| WO | WO-2022069993 A1 | 4/2022 |
| WO | WO-2022150659 A1 | 7/2022 |
| WO | WO-2023240207 A1 | 12/2023 |

OTHER PUBLICATIONS

Abraham, Vivek C. et al. Application of a high-content multiparameter cytotoxicity assay to prioritize compounds based on toxicity potential in humans. SLAS Discovery 13(6):527-537 (2008).

Altschuler, Steven J, and Lani F Wu. Cellular heterogeneity: do differences make a difference? Cell 141(4):559-563 (2010).

Anagnostidis, Vasileios. et al. Deep learning guided image-based droplet sorting for on-demand selection and analysis of single cells and 3D cell cultures. Lab on a Chip 20(5):889-900 (2020).

Attayek, Peter J. et al. Array-based platform to select, release, and capture Epstein-barr virus-infected cells based on intercellular adhesion. Analytical chemistry 87(24):12281-12289 (2015).

Attayek, Peter J. et al. Identification and isolation of antigen-specific cytotoxic T lymphocytes with an automated microraft sorting system. Integrative Biology 8(12):1208-1220 (2016).

Bickle, Marc. High Content Screening in Drug Discovery. Technology Development Studio, Max Planck Institute of Molecular Cell Biology and Genetics :1-12 (2010).

Bigfoot Spectral Cell Sorter, High-throughput plate sorting. Invitrogen :1-5 (2021).

Boutros, Michael. et al. Microscopy-Based High-Content Screening. Cell 163(6):1314-1325 (2015).

Cadwell, Cathryn R. et al. Multimodal profiling of single-cell morphology, electrophysiology, and gene expression using Patch-seq. Nature protocols 12(12):2531-2553 (2017).

Caicedo, Juan C. et al. Applications in image-based profiling of perturbations. Current opinion in biotechnology 39:134-142 (2016).

Caliari, Steven R. et al. A Practical Guide to Hydrogels for Cell Culture. Nature Methods 13(5):405-414 (2016).

Carpenter, Anne E. "Image-based chemical screening." Nature Chemical Biology 3.8 (2007):461-465 (2007).

Chen et al.: Rare cell isolation and analysis in microfluidics. Lab Chip14(4):626-645 (Feb. 2014).

Chen, Kok Hao. et al. Spatially resolved, highly multiplexed RNA profiling in single cells. Science 348(6233):aaa6090, 1-15 (2015).

Choi, Jane Ru. et al. Recent advances in photo-crosslinkable hydrogels for biomedical applications. BioTechniques 66(1):40-53 (2019).

Conrad, Christian. et al. Micropilot: automation of fluorescence microscopy-based imaging for systems biology. Nature methods 8(3):246-249 (2011).

Cortes-Llanos, Belen. et al. A technology of a different sort: microraft arrays. Lab on a Chip 21(17):3204-3218 (2021).

Danuser, Gaudenz. Computer vision in cell biology. Cell 147(5):973-978 (2011).

Datlinger, Paul. et al. Pooled CRISPR screening with single-cell transcriptome readout. Nature methods 14(3):297-301 (2017).

Deforest, Cole A. and Anseth, Kristi S. Cytocompatible Click-based Hydrogels with Dynamically-Tunable Properties Through Orthogonal Photoconjugation and Photocleavage Reactions. Nature Chemistry. 3(12):925-931 (2011).

Drury, Jeanie L. et al. Hydrogels for tissue engineering: scaffold design variables and applications. Biomaterials 24(24):4337-4351 (2003).

Eich, Marcus. Cell Sorting, an Overview. Dkfz :1-38 (2016).

Fairbanks, Benjamin D. et al. A Versatile Synthetic Extracellular Matrix Mimic via Thiol-Norbornene Photopolymerization. Advanced Materials 21(48):5005-5010 (2009).

Fairbanks, Benjamin D. et al. Photodegradable, Photoadaptable Hydrogels via Radical-Mediated Disulfide Fragmentation Reaction. Macromolecules 44(8):2444-2450 (2011).

Falconnet, Didier. et al. Surface engineering approaches to micropattern surfaces for cell-based assays. Biomaterials 27(16):3044-3063 (2006).

Futamura, Yushi. et al. Morphobase, an encyclopedic cell morphology database, and its use for drug target identification. Chemistry and biology 19(12):1620-1630 (2012).

Garagorri, Nerea. et al. Keratocyte behavior in three-dimensional photopolymerizable poly(ethylene glycol) hydrogels. Acta Biomaterialia 4(5):1139-1147 (2008).

Gascoyne, Peter RC. et al. Isolation of rare cells from cell mixtures by dielectrophoresis. Electrophoresis 30(8):1388-1398 (2009).

Gerstner, Andreas OH. et al. Comparison of immunophenotyping by slide-based cytometry and by flow cytometry. Journal of immunological methods 311(1-2):130-138 (2006).

Goda, Keisuke. et al. In flow cytometry, image is everything. Cytometry Part A 95(5):475-477 (2019).

Gomes, Tomás. et al. Immunology driven by large-scale single-cell sequencing. Trends in immunology 40(11):1011-1021 (2019).

(56) References Cited

OTHER PUBLICATIONS

Hao, Yiting. et al. Visible light cured thiol-vinyl hydrogels with tunable degradation for 3D cell culture. Acta biomaterialia 10(1):104-114 (2014).
Hermanson, Greg T. Bioconjugate Techniques, 3rd Edition. Academic Press (2013).
Hoshino, Kazunori. et al. Microchip-based immunomagnetic detection of circulating tumor cells. Lab on a Chip 11(20):3449-3457 (2011).
Hu, Jingjing. et al. A thermo-degradable hydrogel with light-tunable degradation and drug release. Biomaterials 112:133-140 (2017).
Hu, Jingjing. et al. A thermo-degradable hydrogel with light-tunable degradation and drug release. Biomaterials 112:133-140 (2017). (Abstract Only).
Huang, Shih-Hao. et al. Light-addressable Electrodeposition of Cell-encapsulated Alginate Hydrogels for a Cellular Microarray Using a Digital Micromirror Device. Biomicrofluidics 5(3):034109, 1-10 (2011).
Isozaki, Akihiro. et al. A practical guide to intelligent image-activated cell sorting. Nature protocols 14(8):2370-2415 (2019).
Kabb, Christopher P. et al. Photoreversible Covalent Hydrogels for Soft-Matter Additive Manufacturing. ACS Applied Materials and Interfaces 10(19):16793-16801(2018).
Kamentsky, Louis A, and Lee D. Kamentsky. Microscope-based multiparameter laser scanning cytometer yielding data comparable to flow cytometry data. Cytometry: The Journal of the International Society for Analytical Cytology 12(5):381-387 (1991).
Kanfer, Gil. et al. Image-based pooled whole-genome CRISPRi screening for subcellular phenotypes. Journal of Cell Biology 220(2):e202006180, 1-24 (2021).
Kharkar, Prathamesh M. et al. Design of Thiol- and Light-sensitive Degradable Hydrogels using Michael-type Addition Reactions. Polymer Chemistry. 6(31):5565-5574 (2015).
Kharkar, Prathamesh M. et al. Designing degradable hydrogels for orthogonal control of cell microenvironments. Chem Soc Rev 42(17):7335-7372 (2013).
Kharkar, Prathamesh M. et al. Thiol-ene click hydrogels for therapeutic delivery. ACS biomaterials science & engineering 2(2):165-179 (2016).
Koh, Won-Gun. et al. Poly(ethylene glycol) Hydrogel Microstructures Encapsulating Living Cells. Langmuir 18(7):2459-2462 (2002).
Kovac, Joseph. et al. Image-predicated sorting of adherent cells using photopatterned hydrogels. Advanced healthcare materials 2(4):552-556 (2012).
Kozak, Karol. et al. Data mining techniques in high content screening: a survey. Journal of Computer Science and Systems Biology 2(4):219-239 (2009).
Kozak, Karol. et al. Multiparametric analysis of high content screening data. Journal of Biomedicine 2:78-88 (2017).
Labelle, Cody A. et al. Image-Based Live Cell Sorting. Trends in Biotechnology 39(6):613-623 (2021). Published online on Nov. 13, 2020.
Leary, James F. Ultra high-speed sorting. Cytometry Part A: The Journal of the International Society for Analytical Cytology 67(2):76-85 (2005).
Lee, Je Hyuk. et al. Highly multiplexed subcellular RNA sequencing in situ. Science 343(6177):1360-1363 (2014).
Lehninger, Albert L. The Molecular basis of Cell Structure and Function, Second Edition. Biochemistry :1-2 (1975).
Levalley, Paige J. et al. On-demand and tunable dual wavelength release of antibody using light-responsive hydrogels. ACS Appl Bio Mater 3(10):6944-6958 (2020).
Ljosa, Vebjorn. et al. Comparison of methods for image-based profiling of cellular morphological responses to small-molecule treatment. Journal of biomolecular screening 18(10):1321-1329 (2013).
Loo, Lit-Hsin. et al. Image-based multivariate profiling of drug responses from single cells. Nature methods 4(5):445-453 (2007).

Low, Wan Shi, and Wan Abu Bakar Wan Abas. Benchtop technologies for circulating tumor cells separation based on biophysical properties. BioMed research international 2015(1):239362, 1-22 (2015).
Maruyama, Hisataka. et al. Immobilization of individual cells by local photo-polymerization on a chip. Analyst 130(3):304-310 (2005).
Myung, J. H, and S. Hong. Microfluidic devices to enrich and isolate circulating tumor cells. Lab on a Chip 15(24):4500-4511 (2015).
Neumann, Alexander J. et al. Nondestructive evaluation of a new hydrolytically degradable and photo-clickable PEG hydrogel for cartilage tissue engineering. Acta biomaterialia 39:1-11 (2016).
Nsamela, Audrey. Microfluidics for sperm sorting: a review. Microfluidic Reviews, Apr. 22, 2021 ;[retrieved on Apr. 13, 2022]. Available at URL:https://www.elveflow.com/microfluidic-reviews/microfluidics-for-cell-biology/microfluidic-for-sperm-sorting-a-review/ pp. 1-5.
Ozcelik, B. Degradable hydrogel systems for biomedical applications. Biosynthetic Polymers for Medical Applications, Woodhead Publishing :173-188 (2016).
Ozcelik, B. Degradable hydrogel systems for biomedical applications. Biosynthetic Polymers for Medical Applications, Woodhead Publishing :173-188 (2016). (Abstract Only).
PCT/US2023/068154 International Preliminary Report on Patentability dated Dec. 19, 2024.
PCT/US2023/068154 International Search Report and Written Opinion dated Oct. 10, 2023.
Perlman, Zachary E. et al. Multidimensional drug profiling by automated microscopy. Science 306(5699):1194-1198 (2004).
Ploem-Zaaijer, J J. et al. Automated image cytometry for detection of rare, viral antigen-positive cells in peripheral blood. Cytometry 15(3):199-206 (1994).
Raman, Ritu. et al. Light-degradable hydrogels as dynamic triggers for gastrointestinal applications. Science advances 6(3):eaay0065, 1-11 (2020).
Rettig, et al. Large-scale single-cell trapping and imaging using microwell arrays. Anal Chem. Sep. 1, 2005;77(17):5628-34. Published on Web Jul. 30, 2005.
Salazar, Georgina To'A. et al. Characterization of the laser-based release of micropallets from arrays. Journal of Biomedical Optics 13(3):034007, 1-9 (2008).
Sato, Katsuaki, and Shigeharu Fujita. Dendritic cells-nature and classification. Allergology International 56(3):183-191 (2007).
Schiro, Perry G. et al. Sensitive and high-throughput isolation of rare cells from peripheral blood with ensemble-decision aliquot ranking. Angewandte Chemie (International ed. in English) 51(19):4618-4622 (2012).
Sesen, Muhsincan, and Graeme Whyte. Image-based single cell sorting automation in droplet microfluidics. Scientific reports 10(1):8736, 1-14 (2020).
Shadpour, Hamed. et al. Enrichment and expansion of cells using antibody-coated micropallet arrays. Cytometry Part A: The Journal of the International Society for Advancement of Cytometry 75(7):609-618 (2009).
Shamir, Lior. et al. Pattern recognition software and techniques for biological image analysis. PLoS computational biology 6(11):e1000974, 1-10 (2010).
Shields IV, C. Wyatt. et al. Microfluidic cell sorting: a review of the advances in the separation of cells from debulking to rare cell isolation. Lab on a Chip 15(5):1230-1249 (2015).
Shih, Han and Lin, Chien-Chi. Cross-linking and degradation of step-growth hydrogels formed by thiol-ene photoclick chemistry. Biomacromolecules 13(7):2003-2012 (2012).
Song, Kwang Hoon. et al. Complex 3D-printed microchannels within cell-degradable hydrogels. Advanced Functional Materials 28(31):1801331, 1-29 (2018).
Starkuviene, V. and R. Pepperkok. The potential of high-content high-throughput microscopy in drug discovery. British journal of pharmacology 152(1):62-71 (2007).
Stoeckius, Marlon. et al. Large-scale simultaneous measurement of epitopes and transcriptomes in single cells. Nature methods 14(9):865-868 (2017).
Sun, Tao. et al. Image-based single-cell sorting via dual-photopolymerized microwell arrays. Analytical chemistry 86(2):977-981 (2014).

(56) References Cited

OTHER PUBLICATIONS

Tanaka, Masahiro. et al. An unbiased cell morphology-based screen for new, biologically active small molecules. PLoS biology 3(5):e128, 1-13 (2005).

Valihrach, Lukas. et al. Platforms for single-cell collection and analysis. International journal of molecular sciences 19(3):807, 1-20 (2018).

Wang, Chong. et al. Imaging-based pooled CRISPR screening reveals regulators of lncRNA localization. Proceedings of the National Academy of Sciences of the United States of America 116(22):10842-10851 (2019).

Wang, Yuchen. et al. Degradable poly (ethylene glycol)(PEG)-based hydrogels for spatiotemporal control of siRNA/nanoparticle delivery. Journal of Controlled Release 287:58-66 (2018).

Wang, Yuli. et al. Broadening cell selection criteria with micropallet arrays of adherent cells. Cytometry Part A: The Journal of the International Society for Analytical Cytology 71(10):866-874 (2007).

Wang, Yuli. et al. Micromolded arrays for separation of adherent cells. Lab on a Chip 10(21):2917-2924 (2010).

Wang, Yuli. et al. Micropallet arrays with poly (ethylene glycol) walls. Lab on a Chip 8(5):734-740 (2008).

Weile, Jochen, and Frederick P. Roth. Multiplexed assays of variant effects contribute to a growing genotype-phenotype atlas. Human genetics 137(9):665-678 (2018).

Weile, Jochen. Extending the Atlas of Variant Effects in Human Disease Genes. University of Toronto (2017).

Welch, Joshua D. et al. Selective single cell isolation for genomics using microraft arrays. Nucleic acids research 44(17):8292-8301 (2016).

Welch, Joshua D. et al. Supplementary Data: Selective single cell isolation for genomics using microraft arrays. Nucleic acids research 44(17):8292-8301 (2016).

Wheeler, Emily C. et al. Pooled CRISPR screens with imaging on microraft arrays reveals stress granule-regulatory factors. Nature Methods 17(6):636-642 (2020).

Xu, Da-Ming. et al. Investigation of lymphocyte subsets in peripheral blood of patients with dyslipidemia. International Journal of General Medicine :5573-5579 (2021).

Xu, Wei. et al. Microcup arrays for the efficient isolation and cloning of cells. Analytical chemistry 82(8):3161-3167 (2010).

Yan, Xiaowei. et al. High-content imaging-based pooled CRISPR screens in mammalian cells. Journal of Cell Biology 220(2):e202008158, 1-21 (2021).

Yenkin, Alex L. et al. Mitochondrial Phenotypes Distinguish Pathogenic MFN2 Mutations by Pooled Functional Genomics Screen. bioRxiv preprint:1-61 (2021).

Yuan, Jinzhou, and Peter A. Sims. An automated microwell platform for large-scale single cell RNA-seq. Scientific reports 6(1):33883, 1-10 (2016).

Zalipsky, Samuel, and J. Milton Harris. Introduction to Chemistry and Biological Applications of Poly (ethylene glycol). American Chemical Society :1-13 (1997).

Zanella, Fabian. et al. High content screening: seeing is believing. Trends in biotechnology 28(5):237-245 (2010).

Zborowski, Maciej, and Jeffrey J. Chalmers. Rare cell separation and analysis by magnetic sorting. analytical Chemistry:8050-8056 (2011).

Zhu, He. et al. A Miniature Cytometry Platform for Capture and Characterization of T-lymphocytes from Human Blood. Analytica Chimica Acta 608(2):186-196 (2008). Online published Dec. 28, 2007.

* cited by examiner

Sorting CD56 bright NK cells in a NK/Jurkat population cPEG structure (1018)

cSEL structure (1020)

CELL SORTING AND SELECTION USING DEGRADABLE HYDROGELS

CROSS-REFERENCE TO RELATED APPLICATIONS

This application is a continuation of International Patent Application No. PCT/US2023/068154, filed Jun. 8, 2023, which claims the benefit of U.S. Provisional Application No. 63/350,813, filed Jun. 9, 2022, which is incorporated herein by reference in its entirety.

BACKGROUND

Because of its high information content, image-based analysis and sorting of cells is of great interest in many areas including cancer diagnostics, drug discovery, immunocytochemistry, phenotype-genotype analysis, and the like, e.g. LaBelle et al, Trends in Biotechnology, 39(6): 614-623 (2021), Boutros et al, Cell, 163: 1314-1325 (2015); Caicedo et al, Curr. Opin. Biotechnology, 39: 134-142 (2016); Wang et al, Proc. Natl. Acad. Sci., 116(22): 10842-10851 (2019); Ploem-Zaaijer et al, Cytometry, 15: 199-206 (1994). As pointed out by LaBelle, current image-based sorting systems roughly follow three approaches: (i) imaging during flow through a microfluidic system, (ii) imaging after capture or containment in a microfluidics system, and (iii) imaging in a microwell array. The three approaches have significant trade-offs among important performance parameters, such as throughput, scalability and capability. For example, imaging during flow requires sophisticated high speed optical systems and processing. Microfluidic capture and containment avoid the imaging challenges of flow systems, but reduce throughput and flexibility. Microwell array systems permit excellent image collection but have low throughput.

SUMMARY

In view of the above, image-based selection and sorting would be advanced by the availability of an image-based technique that had the advantages of a microarray-based system but was readily scalable and had flexible containment and sorting capabilities.

In an aspect, described herein is a method of selecting or sorting cells using degradable gel structures. In an aspect, described herein is a method of sorting cells comprising: (a) providing a fluidics device comprising: (i) a channel comprising a surface, (ii) a spatial energy modulation element in optical communication with the surface, and (iii) a detector in optical communication with the surface and in operable association with the spatial energy modulating element, the detector identifying cells and determining positions thereof on the surface; (b) loading the channel with cells and one or more polymer precursors so that the cells are disposed on or adjacent to the surface; (c) immobilizing one or more cells selected based on one or more optical signals therefrom by synthesizing one or more gel structures enclosing each of the one or more cells by projecting light into the channel with the spatial energy modulating element such that the projected light causes cross-linking of the one or more polymer precursors to form gel structures, wherein the positions of the gel structures in the channel are determined by the positions of the cells enclosed thereby identified by the detector; and (d) removing from the channel unselected cells. In some cases, the method further comprises repeating the steps (b) through (c). In some embodiments, steps (b) through (c) are repeated until the immobilized cells reach a predetermined density on the surface. In some embodiments, the method further comprises degrading the gel structures of the immobilized cells and eluting the selected cells from the channel. In some embodiments, the one or more optical signals are indicative of cell morphology, cell size, cell shape, organelle size, organelle shape, surface protein expression, cell motility, cell migration rate, cellular replication rate, or protein secretion. In some particular embodiments, the one or more optical signals comprise a series of images from which cell migration rates may be determined. For example, from a series of images of the surface, cellular position may be recorded as a function of time, so that migration rate or speed may be determined. In other particular embodiments, the one or more optical signals comprise a series of images from which cell-cell interactions, such as, cell killing, may be determined or quantified. In some embodiments, the gel structures comprise photochemically degradable linkages. In some embodiments, the gel structures comprise enzymatically degradable linkages. In some embodiments, the gel structures comprise chemically degradable linkages, such as, disulfide bonds. In some embodiments, the gel structures comprise hydrogel chambers each having an interior. In some particular embodiments, a cell is captured or contained in such an interior. In some embodiments, the hydrogel chambers each have an annular-like shape. In some embodiments, a gel structure comprises a solid mass encapsulating a cell.

In another aspect, described herein is a method of performing an assay on cells from a plurality of samples comprising: (a) providing a fluidics device comprising: (i) a channel comprising a surface, (ii) a spatial energy modulation element in optical communication with the surface, and (iii) a detector in optical communication with the surface and in operable association with the spatial energy modulating element, the detector identifying cells and determining positions thereof on the surface; (b) loading the channel with cells of a sample and one or more polymer precursors so that the cells are disposed on or adjacent to the surface; (c) synthesizing one or more gel structures enclosing each of the one or more cells of the sample by projecting light into the channel with the spatial energy modulating element such that the projected light causes cross-linking of the one or more polymer precursors to form gel structures, wherein the positions of the synthesized gel structures in the channel are determined by the positions of the cells enclosed thereby identified by the detector; (d) repeating steps (b) and (c) for each sample of the plurality; and (e) performing an assay on the cells in the channel to obtain assay results for each of the cells enclosed by a gel structure. In some embodiments, the method further comprises determining the assay results for each of the samples by associating assay results with the positions of the cells of the sample. In some embodiments, the gel structure is a hydrogel chamber.

In another aspect, provided herein is a method of sorting cells, comprising (a) providing a fluidic device comprising: (i) a channel comprising a surface, one or more polymer precursors, and one or more cells, (ii) a spatial energy modulating element in optical communication with the surface, and (iii) a detector in optical communication with the surface and in operable association with the spatial energy modulating element; (b) using the detector, identifying a position of a subset of the one or more cells, wherein the subset of the one or more cells is selected based on one or more optical signals therefrom; (c) controlling the spatial energy modulating element to project energy based on the position of the subset of the one or more cells identified by the detector into the channel such that the projected energy causes the one or more polymer precursors to form one or more gel structures enclosing the subset of the one or more cells, and wherein the one or more cells not in the subset of the one or more cells are not enclosed by the one or more gel structures; and (d) removing from the channel the one or more cells not in the subset of the one or more cells.

BRIEF DESCRIPTIONS OF THE DRAWINGS

DETAILED DESCRIPTION

Figure 1A:
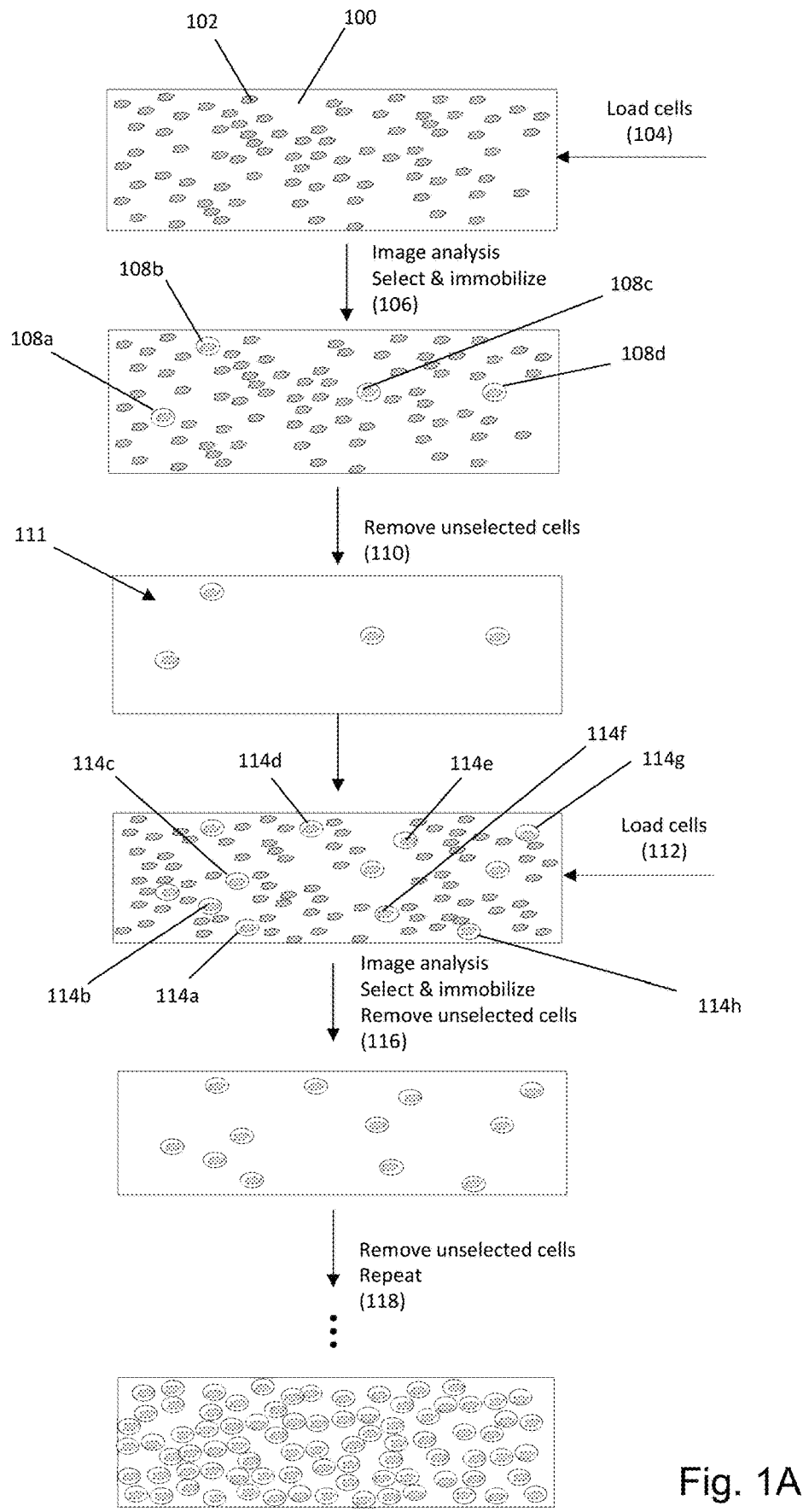
FIGS. 1A-1B illustrate embodiments of the systems and methods described herein for selecting and sorting cells.

The practice of the systems and methods described herein may employ, unless otherwise indicated, conventional techniques and descriptions of organic chemistry, molecular biology (including recombinant techniques), cell biology, and biochemistry, which are within the skill of the art. Such conventional techniques include, but are not limited to, preparation of synthetic polynucleotides, monoclonal antibodies, antibody display systems, cell and tissue culture techniques, nucleic acid sequencing and analysis, and the like. Specific illustrations of suitable techniques can be had by reference to the example herein below. However, other equivalent conventional procedures can, of course, also be used. Such conventional techniques and descriptions can be found in standard laboratory manuals such as Genome Analysis: A Laboratory Manual Series (Vols. I-IV); PCR Primer: A Laboratory Manual; Retroviruses; and Molecular Cloning: A Laboratory Manual (all from Cold Spring Harbor Laboratory Press); Renault and Duchateau, Editors, Site-directed Insertion of Transgenes (Springer, Heidelberg, 2013); Lutz and Bornscheuer, Editors, Protein Engineering Handbook (Wiley-VCH, 2009); and the like. Guidance for selecting materials and components to carry out particular functions may be found in available treatises and references on scientific instrumentation including, but not limited to, Moore et al, Building Scientific Apparatus, Third Edition (Perseus Books, Cambridge, MA); Hermanson, Bioconjugate Techniques, 3rd Edition (Academic Press, 2013); and like references.

The methods and systems described herein may use degradable gels for selecting, sorting and segregating cells, especially based on optically measurable characteristics. In one aspect, sorting, selecting and segregating is accomplished by immobilizing individual cells having desired characteristics by synthesizing degradable gel structures that encapsulate or enclose the cells of interest. In some embodiments, whenever a desired number of cells having the desired characteristics have been accumulated (and unselected cells removed), the encapsulating or enclosing gel structures may be degraded to release the selected cells. Apparatus for carrying out such procedures is described more fully below. Briefly, in some embodiments, cells combined with polymer precursors are loaded in a flow cell channel so that cells are disposed on a surface and detected (possibly after assay steps), after which selected cells (e.g., based on assay results) are immobilized on the surface by enclosing them in photosynthesized degradable gel structures. (In some embodiments, cells and polymer precursors may be loaded into a channel in sequence, e.g. cells may be loaded and disposed on the channel surface after which polymer precursors are loaded). Unselected cells are removed, after which gel structures of the selected cells are degraded and the selected cells are recovered. Sorting and selection may be based on a wide variety characteristics measured from images and/or assay results including, but not limited to, size, morphology, organelle characteristics, motility, migration rate, surface protein expression, secreted protein profile, cell-cell interactions, and the like.

In another aspect, sorting, selecting and segregating is accomplished by immobilizing individual cells that fail to have desired characteristics by synthesizing gel structures that encapsulate or enclose such cells but leave cells having desired characteristics free to be eluted from the flow cell.

In another aspect, a plurality cell samples may be processed or subjected to the same assay simultaneously in the same flow cell channel. In some embodiments of this aspect, a plurality of samples of cells may be disposed sequentially on the same surface. After each sample is loaded, the positions of the cells are determined optically and the cells are immobilized by synthesizing one or more gel structures that enclose the cells. Thus, for each sample a map of cell and/or gel structure locations is obtained that permits assay results for individual cells to be assigned to a particular sample. After all of the samples have been loaded and cells immobilized, one or more assays may be performed at the same time on all of the cells on the surface. In an aspect, the gel structures may or may not be degradable, depending in part whether it is desired to recover the cells after the assay(s) have been completed. Moreover, the gel structures synthesized for enclosing cells of a sample may have different compositions or geometries, so that (for example) if an assay comprised pulsing cells different doses of a compound, the gel structure compositions and/or wall thicknesses may be formulated to result in gel structures with different diffusivities so that cells of different samples receive different doses of the compound.

Figure 1B:
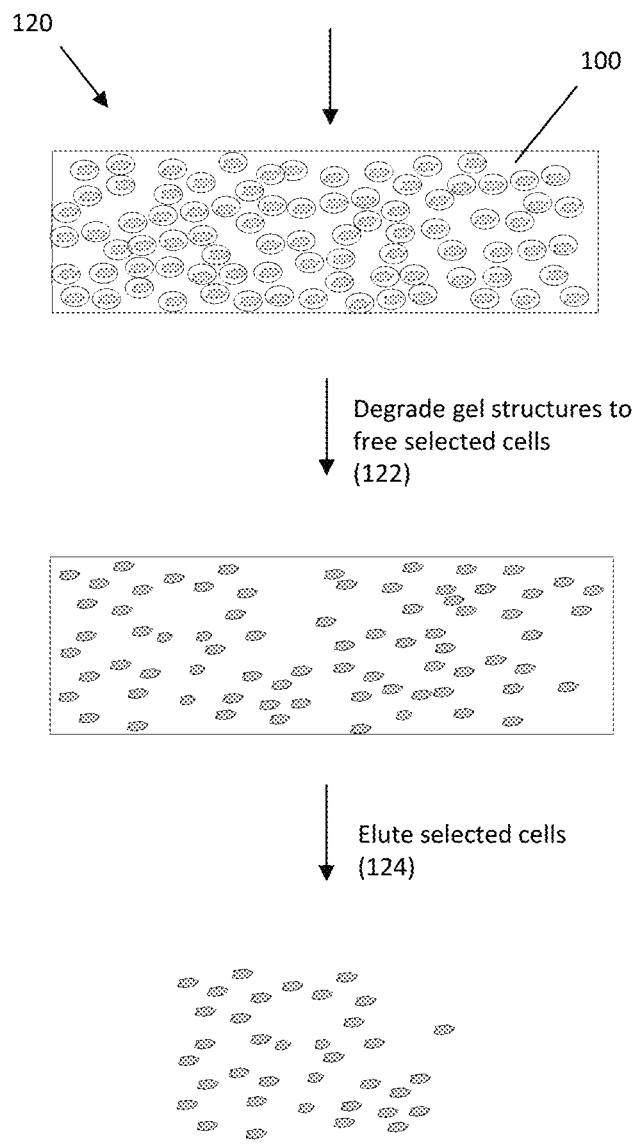

FIGS. 1A-1B illustrate an embodiment of a cell sorting method using an apparatus as described more fully below. In some embodiments, such apparatus is a fluidic device with a channel having a surface on which cells may be disposed, imaged and immobilized by synthesizing gel structures to enclose or encapsulate the cells. At the top of FIG. 1A, cells (e.g. 102) are loaded (104) into a channel (not shown) so that they are disposed on surface (100), after which a detector of the apparatus records their positions and collects optical signals indicative of cell characteristics, such as, for example, size, morphology, nuclear-to-cytoplasm area or volume ratio, surface protein profile, secreted protein profile, or the like. Based on such measurements, cells may be selected (e.g. 108*a-d*) that have values for these measurements that fall within predetermined bounds. Such selected cells are immobilized by photo-synthesizing around each them a gel structure (shown as circles around selected cells 108*a-d*) (also illustrated in perspective in FIG. 2). The positions of the gel structures are determined by the positions of the cells they enclose which, in turn, are determined by optical detection. Such gel structure may have a wide variety of shapes and compositions. In some embodiment, a gel structure may comprise a solid mass of gel material contacting and encapsulating a cell. In some embodiments, such mass may have a well-defined shape, e.g. a solid cylinder, a half-sphere, a cube, or the like. In some embodiments, a gel structure may comprise polymer matrix walls that surround and enclose a cell without contacting the cell, such as, a hydrogel chamber described more fully below. In some embodiments, a channel may be part of a flow cell wherein the channel comprises a first surface and a second surface, and hydrogel chambers comprise polymer matrix walls that extend from the first surface to the second surface and enclose a cell. After selected cells are immobilized by synthesizing gel structures, unselected cells are removed (110) from surface (100) so that only cells immobilized by gel structures remain (111). This process may be repeated so that a further population of cells is loaded (112) into the channel so that they are disposed on surface (100). Positions of the newly loaded cells are determined and recorded and optical signals are collected to determine which of the newly loaded cells have characteristics for selection. After such determination, selected cells of the second loading are immobilized by synthesizing gel structures that enclose each of the cells, e.g. (114*a-h*). Unselected cells are removed (118). These steps are repeated (118) until a predetermined number of selected cells is reached or surface (100) becomes too crowded for further selections and immobilizations. For sorting, the gel compositions may be formulated to permit degradation by a variety of mechanisms described below. As illustrated in FIG. 1B, gel structures (120) on surface (100) may be treated (122) with an agent that degrades or depolymerizes the gel structure and frees the immobilized cells, after which they may be eluted (124) from the flow cell.

As discussed below, a wide variety of photo-synthesizable gels and degradable gels are available for implementing the systems and methods described herein. Guidance for selecting such gels for desired properties including, but not limited to, biocompatibility, gelation speed, degradation speed, and like properties, is provided in the following references, which are incorporated by reference: Kharkar et al, Chem. Soc. Rev., 42: 7335-7372 (2013); Kharkar et al, Polymer Chem., 6(31): 5565-5574 (2015); Neumann et al, Acta Biomater., 39: 1-11 (2016); DeForest et al, Nature Chemistry, 3(12): 925-931 (2012); Bowman et al, U.S. Pat. No. 9,631,092; LeValley et al, ACS Appl. Bio. Mater., 3(10): 6944-6958 (2020); Kabb et al, ACS Appl. Mater. Interfaces, 10: 16793-16801 (2018); Fairbanks et al, Macromolecules, 44: 2444-2450 (2011); Fairbanks et al, Adv. Mater., 21(48): 5005-5010 (2009); Sugiura et al, U.S. patent publication US2016/0177030; Shih et al, Biomacromolecules, 13(7): 2003-2012 (2012); and the like. In some embodiments, photo-synthesized gels are formed using a photo-initiator for radical polymerization. In some embodiments, photo-initiators comprise Irgacure 2959, Lithium phenyl-2,4,6-trimethylbenzoylphosphinate (LAP), or Eosin-Y (e.g. see Choi et al, Biotechniques, 66(1): 40-53 (2019)). In some embodiments, hydrogel precursors comprise hyaluronic acid, chitosan, heparin, alginate, polyethylene glycol (PEG), multi-arm PEG, poly(ethylene glycol)-b-poly(propylene oxide)-b-poly(ethylene glycol) (PEG-PPO-PEG), poly(lactic acid-co-glycolic acid)-b-poly(ethylene glycol)-b-poly(lactic acid-co-glycolic acid) (PLGA-PEG-PLGA), and poly(vinyl alcohol). In some embodiments, polymer precursors comprise PEG or multi-arm PEG. In some embodiments, polymer precursors comprise an enzymatically degradable cross-linker. In some embodiments, such enzymatically degradable cross-linker is degradable by an esterase or a peptidase. In some embodiments, polymer precursors comprise a photo-degradable cross-linker. In some embodiments, such photo-degradable cross-linker comprises a nitrobenzyl group. In some embodiments, such photo-degradable cross-linker comprises a coumarin moiety. In some embodiments, photo-degradable hydrogels are used with methods described herein, for example, because photo-degradation of hydrogel chambers may be carried out selectively and on-demand, so that specified hydrogel chambers may be degraded without affecting non-selected hydrogel chambers are unaffected. In some embodiments, hydrogel chambers are degraded non-selectively, so that all hydrogel chambers in a given channel (or other vessel) are degraded simultaneously. In some embodiments, such non-selective degradation is carried out with a cleavage reagent that specifically cleaves a labile bond in a hydrogel. For example, such cleavage agent comprises a reducing agent. In some embodiments, such non-specific degradation is carried out with an enzyme that cleaves a bond or chemical element in a hydrogel. For example, chemical elements include, but are not limited to, peptides, polysaccharides and oligonucleotides.

Figure 2:
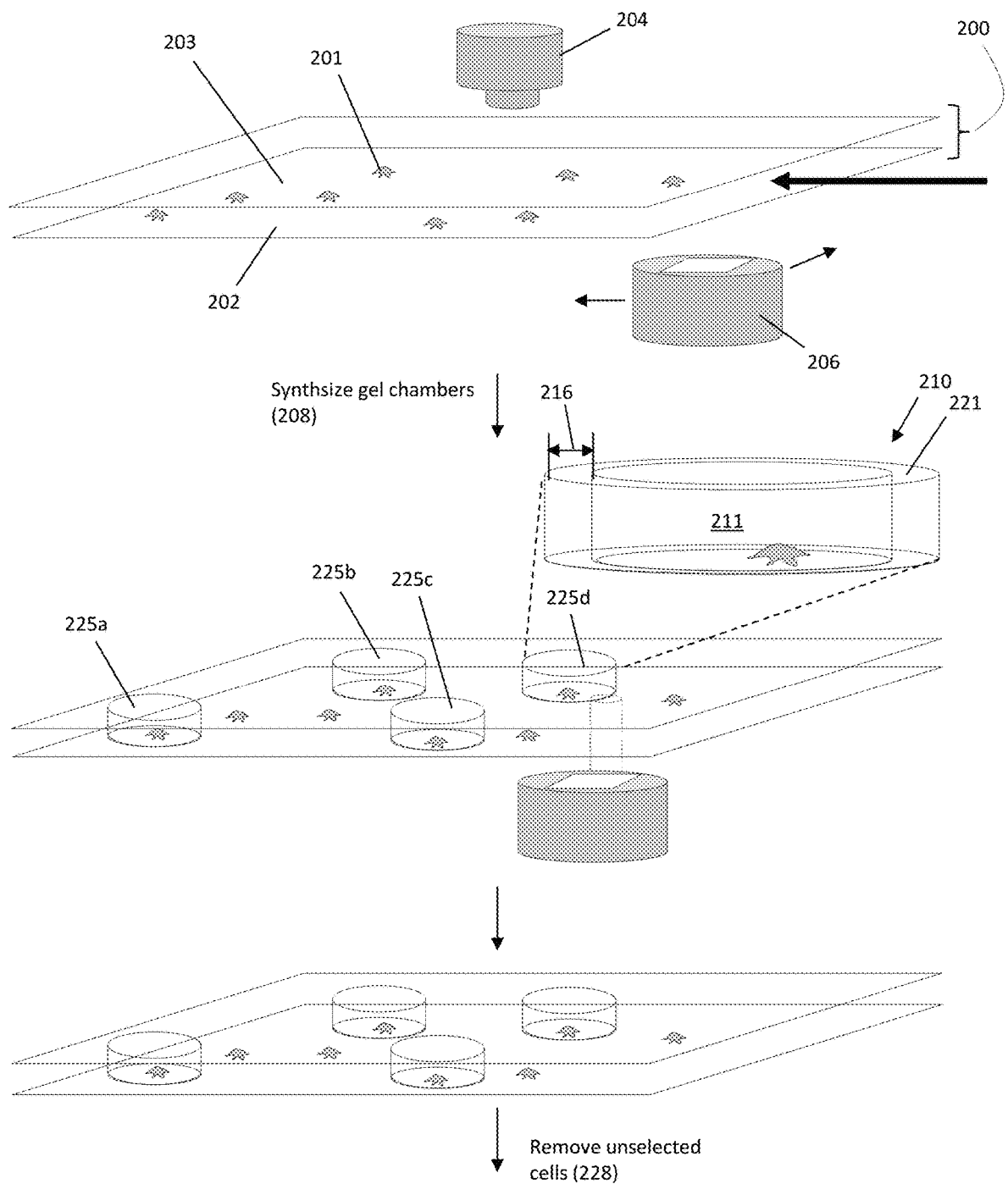
FIG. 2 illustrate an apparatus for detecting and enclosing desired cells in gel structures.

FIG. 2 illustrates features of an apparatus for immobilizing cells by synthesizing gel structures, and an example of a cylindrical hydrogel chamber. (Further descriptions of such apparatus is provided in FIGS. 8A-8B). Cells (e.g. 201) combined with one or more polymer precursors are loaded into channel (200) comprising first surface (202) and second surface (203) so that cells are disposed on surface (202). First and second surfaces (202 and 203) are parallel and typically comprise surfaces of optically transmissive materials, such as glass. Detector (204) (together with an image-recording system and computer) detects and/or collects images of the cells including their positions on surface (202). In operational association with detector (204) is spatial energy modulating element (206), such as a digital micromirror device (DMD), that under programmed control projects light energy into channel (200) for photo-polymerizing the polymer precursors to form polymer matrices within channel (200). Such a polymer matrix may comprise a solid gel mass encapsulating a cell or it may comprise a more complex structure, such as a hollow cylinder, or like structure, which may enclose a cell without directly contacting the cell. Such hollow structures may comprise polymer matrix walls that extend from first surface (202) to second surface (203) to form an enclosure (sometimes referred to herein as a "hydrogel chamber" or simply a "chamber") comprising a cell. After cells are analyzed optically, gel masses or chambers are synthesized (208) to immobilize selected cells. In FIG. 2 the hydrogel chambers are shown as solid cylinders (225*a-d*) in channel (200) for convenience, although they are intended to represent hollow cylinder (210) shown in the blow-up. Hollow cylinder, or chamber (210) has wall (221) with thickness (216) enclosing interior (211). After synthesis of hydrogel chambers enclosing the selected cells, unselected cells are removed (228).

Figure 3:
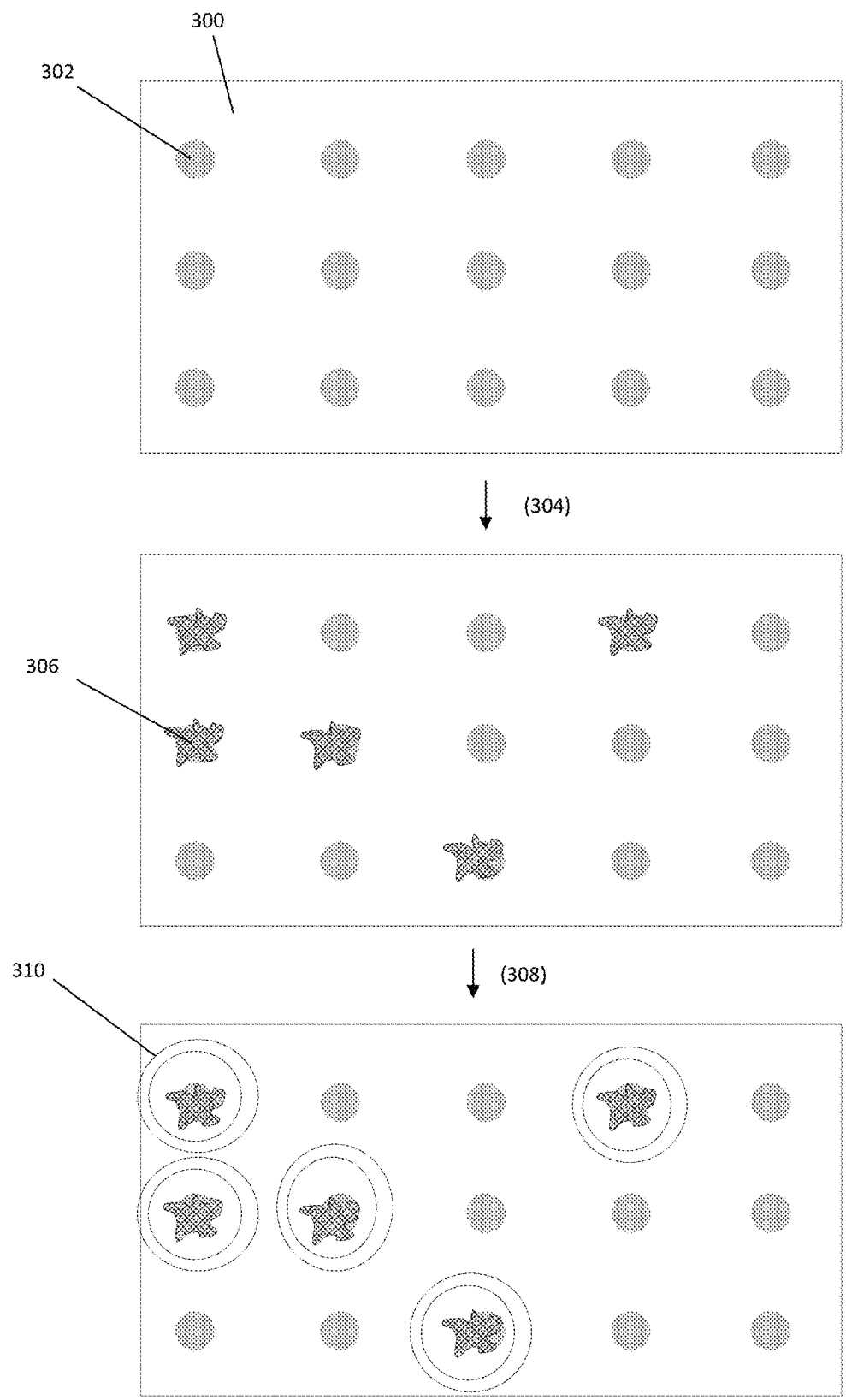
FIG. 3 illustrates an embodiment wherein cells are captured on a surface at regularly spaced sites.
Figure 4A:
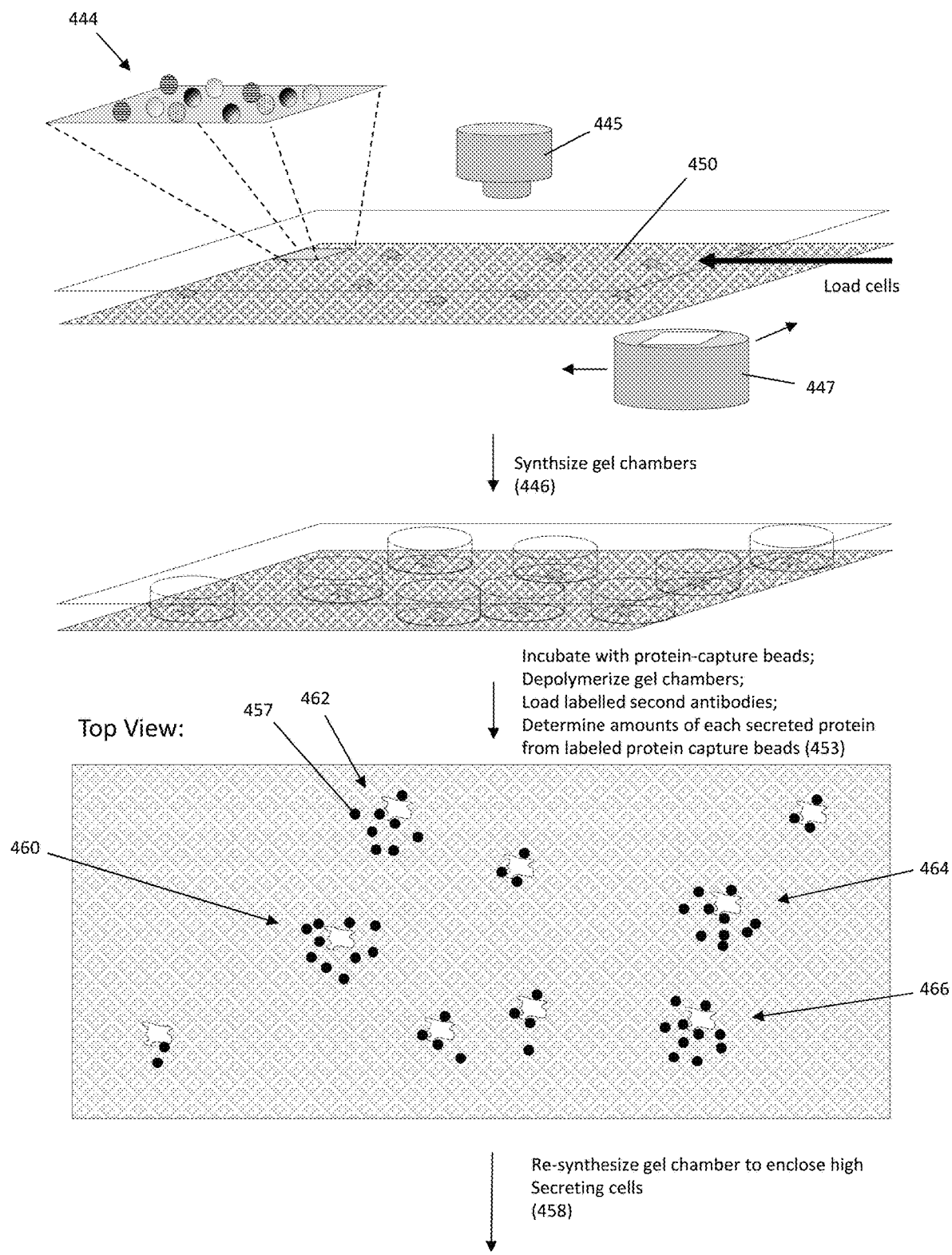
FIGS. 4A-4B illustrate an embodiment for sorting cells that secret selected proteins at a high level.
Figure 4B:
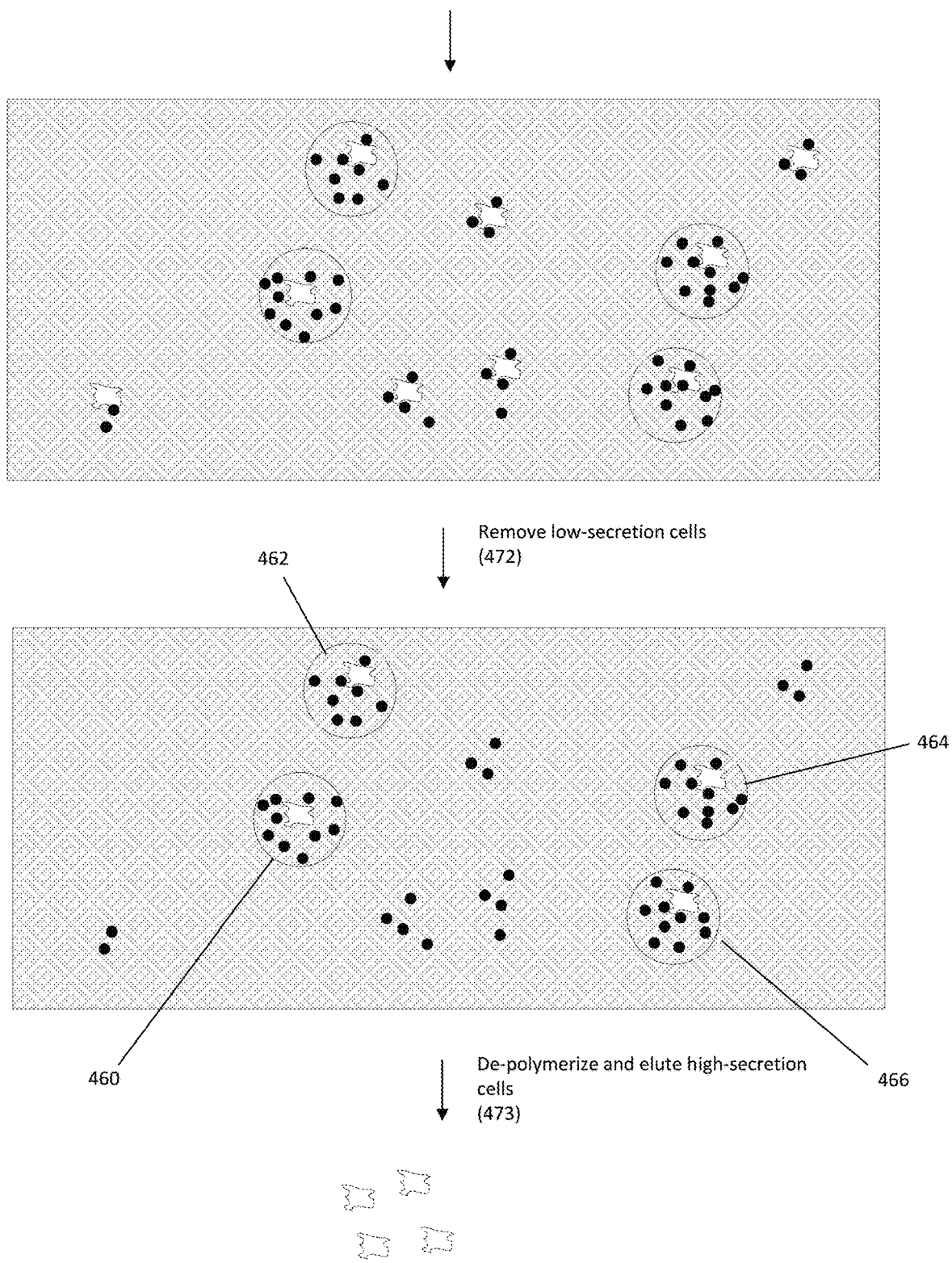

FIG. 3 illustrates that in some embodiments cells may be disposed non-randomly on surface (300) by providing a surface with a regular array of cell adhesion sites (302), which may be prepared by a variety of techniques, e.g. Zhu et al, Analytica Chimica Acta, 608(2): 186-196 (2008), or the like. In some embodiments, such sites may comprise antibodies specific for selected cell surface proteins. In some embodiments, such site may comprise integrin proteins or peptides, or like proteins. After loading (304) cells (e.g. 306) the cells adhere to sites (302) in a regular pattern as illustrated. Hydrogel chambers (310) may then be synthesized to enclose and immobilize the cells, after which further rounds of loading and selection may be performed. In some embodiments, such spatially regular arrangements makes imaging and synthesis of gel structures more efficient.

FIGS. 4A-4B, 5A-5B and 6A-6B illustrate embodiments for sorting cells based on protein secretion profile, growth rate and migration rate, respectively. In other embodiments, cells may be sorted based on other (or additional) characteristics, such as, cell-cell interactions, cell killing, antigen presentation, or the like.

In regard to protein secretion, a uniform distribution of protein-capture beads (e.g. BioLegend, Inc., San Diego) is attached to surface (450) prior to loading cells. As illustrated in blow-up (444), the uniform distribution may include beads with antibodies specific for different proteins, e.g. a different type of bead for each of a plurality of cytokines. In one embodiment, sorting based on secretion proceeds as follows: After deposition of cells on surface (450), cells are located by detector (445) and hydrogel chambers are synthesized (446) by spatial energy modulating element (447). Secreted proteins are detected by being captured by protein-capture beads and then labeled with detection antibodies, illustrated by solid dots (e.g. 457) in the hydrogel chambers (only a single bead type is shown for clarity). In some embodiments, porosity of the polymer matrix walls of the chambers is selected to prevent passage of cells but to allow the free passage of proteins. In other embodiments, such porosity is selected to prevent to passage of both cells and proteins. In the latter embodiment, an added step of depolymerizing the polymer matrix walls is included to provide access for the detection antibodies. For example, polymer matrix walls are selected to permit selective photo-degradation. Relative amounts of secreted proteins from each cell are determined (453) by either counting labeled beads of the different types adjacent to, or in the proximity of the cells of each chamber, or by integrating the different fluorescent signals from the beads adjacent to, or in the proximity of, the cells of each chamber. From the illustration of FIG. 4A, hydrogel chambers (460, 462, 464 and 466) comprise cells with the highest secretion rates (illustrated by the quantity of filled-in beads). After high-secreting cells are identified, they are re-enclosed by synthesizing (458) hydrogel chambers around them, after which unselected cells are removed (472). As illustrated, chambers (482, 484 and 486) comprise cells with high secretion rates. After such removal, the chambers of the high secretion rate cells may be degraded and the cells eluted (459). Alternatively, low-secreting cells may be re-enclosed or immobilized by a gel structure, after which selected high-secreting cells are eluted.

Figure 5A:
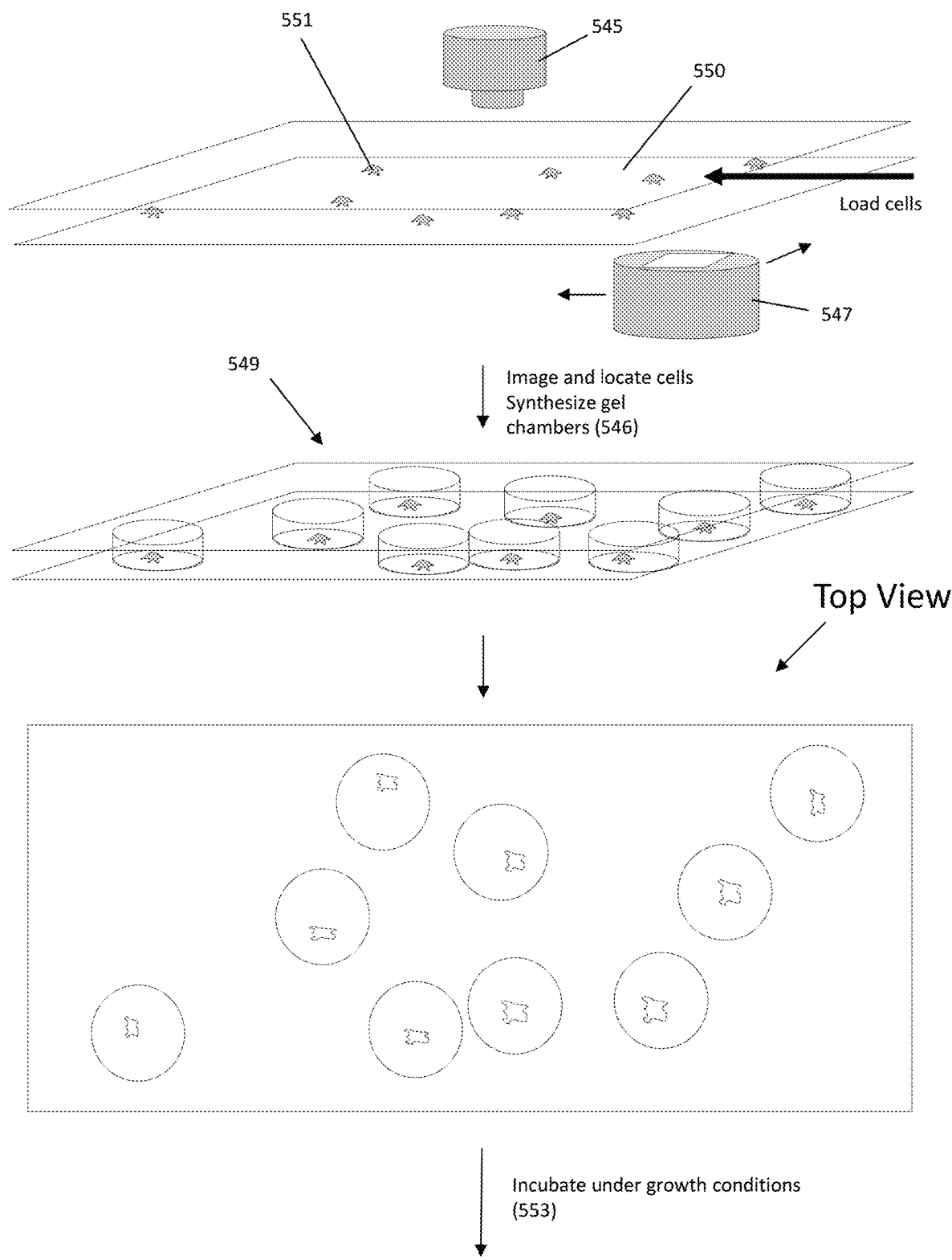
FIGS. 5A-5B illustrate an embodiment for sorting cells that have high growth rates.
Figure 5B:
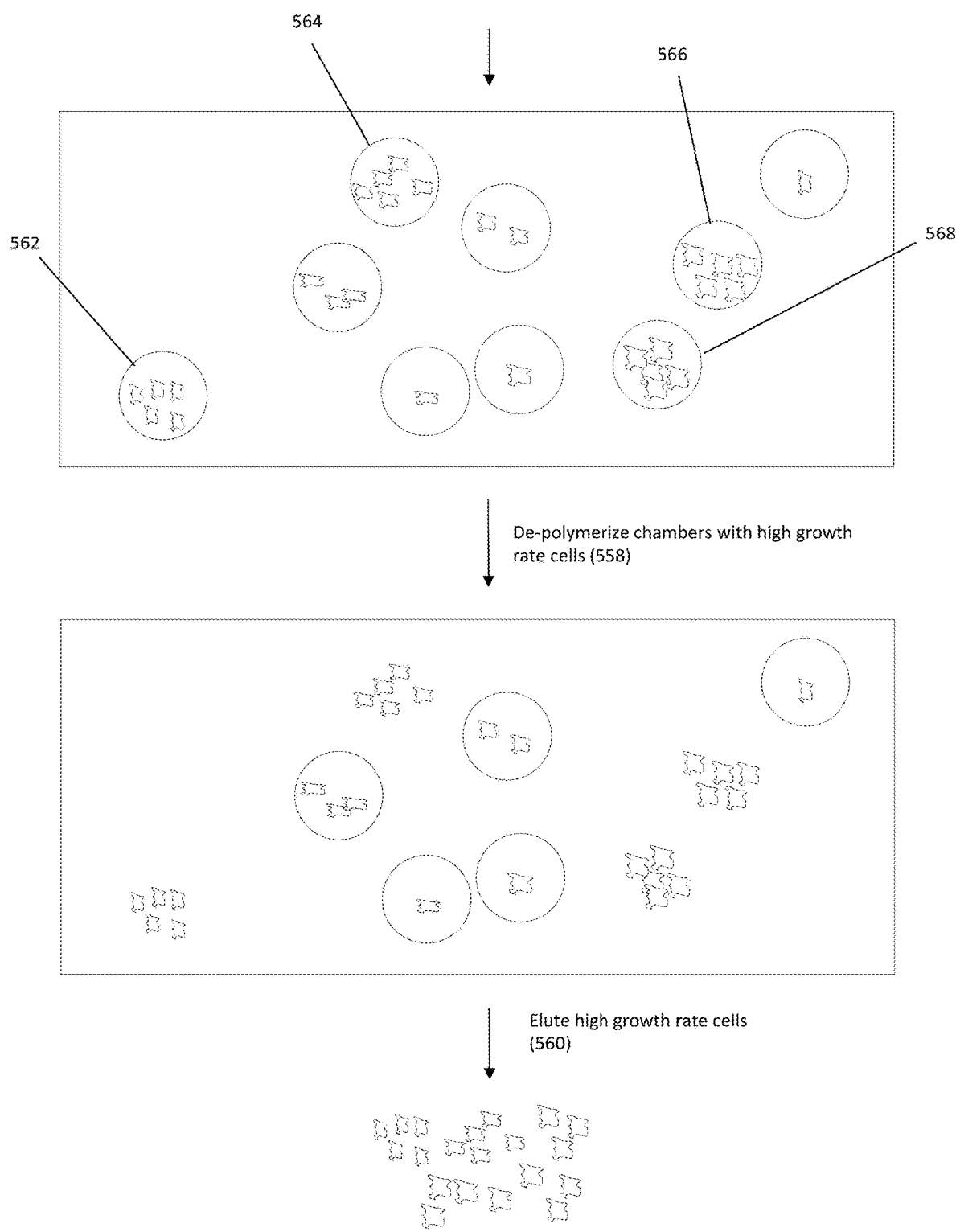

FIGS. 5A-5B illustrate steps of an embodiment for sorting cells based on growth rate. Cells (e.g. 551) are disposed on surface (550) where they are located by detector system (545) and are enclosed by synthesizing (546) hydrogel chambers (549) (also shown in top view in the bottom panel) using spatial energy modulating element (547). Cells are incubated under growth conditions (553), during which incubation hydrogel chambers are imaged periodically by the detector system to determine the number of cells in each chamber. In some embodiments, cell number is used as a measure of growth rate, so that after a given period of incubation hydrogel chambers may be identified as comprising high growth rate cells or low growth rate cells based on cell numbers, as illustrated in the top panel of FIG. 5B, where chambers (562, 564, 566 and 568) are selected as comprising high growth rate cells. Such hydrogel chambers are then selectively degraded, or equivalently depolymerized, (558) (i.e. "on-demand"), after which the freed high growth rate cells are eluted (560). In some embodiments of the proliferation assay, each hydrogel chamber synthesized has the same shape and area, for example, annular-like with an interior area selected from the range of 0.001 to 0.01 mm2, or in the range of 0.001 to 1.0 mm2. In some embodiments, each hydrogel chamber synthesized has the same shape and area for each different type of cell being assayed, for example, cytotoxic T lymphocytes may be confined in chambers having one area whereas helper T lymphocytes may be confined in chambers having another area. After a desired number of hydrogel chambers are synthesized, cells are incubated for a period under growth conditions, after which (for example) cells in each chamber are counted (220) to give a measure of proliferative capacity for each cell. In some embodiments, after synthesizing chambers to enclose selected cells, non-selected cells may be removed by a washing step or by other changes of reagents in the channel. In some embodiments, cells may be stained with a membrane or intracellular dye for determining proliferation by dye dilution so that an independent measure of cell proliferation may be obtained. Exemplary intracellular dyes for dye dilution include, but are not limited to, Hoechst 33342, carboxyfluorescein succinimidyl ester (CFSE), and the like. The desired number of single cells enclosed by chambers depends on statistical confidence desired in the measured values. If a subpopulation of interest is present as only a small fraction of a total population then a larger number chambers is required. In some embodiments in which mammalian cells are assayed the number of hydrogel chambers synthesized around single cells may be greater than 100; or greater than 1000; or greater than 10,000; or the number may be in the range of from 100 to 100,000; or in the range of from 1000 to 100,000. After counts are recorded for each chamber, further assays may be conducted on the clonal populations within the chambers to identify the cell types, for example, by an assessment of cell surface proteins, cell protein secretions, transcriptome, or the like. This approach is particularly useful for assessing populations of immune cells, especially engineered immune cells.

Figure 6A:
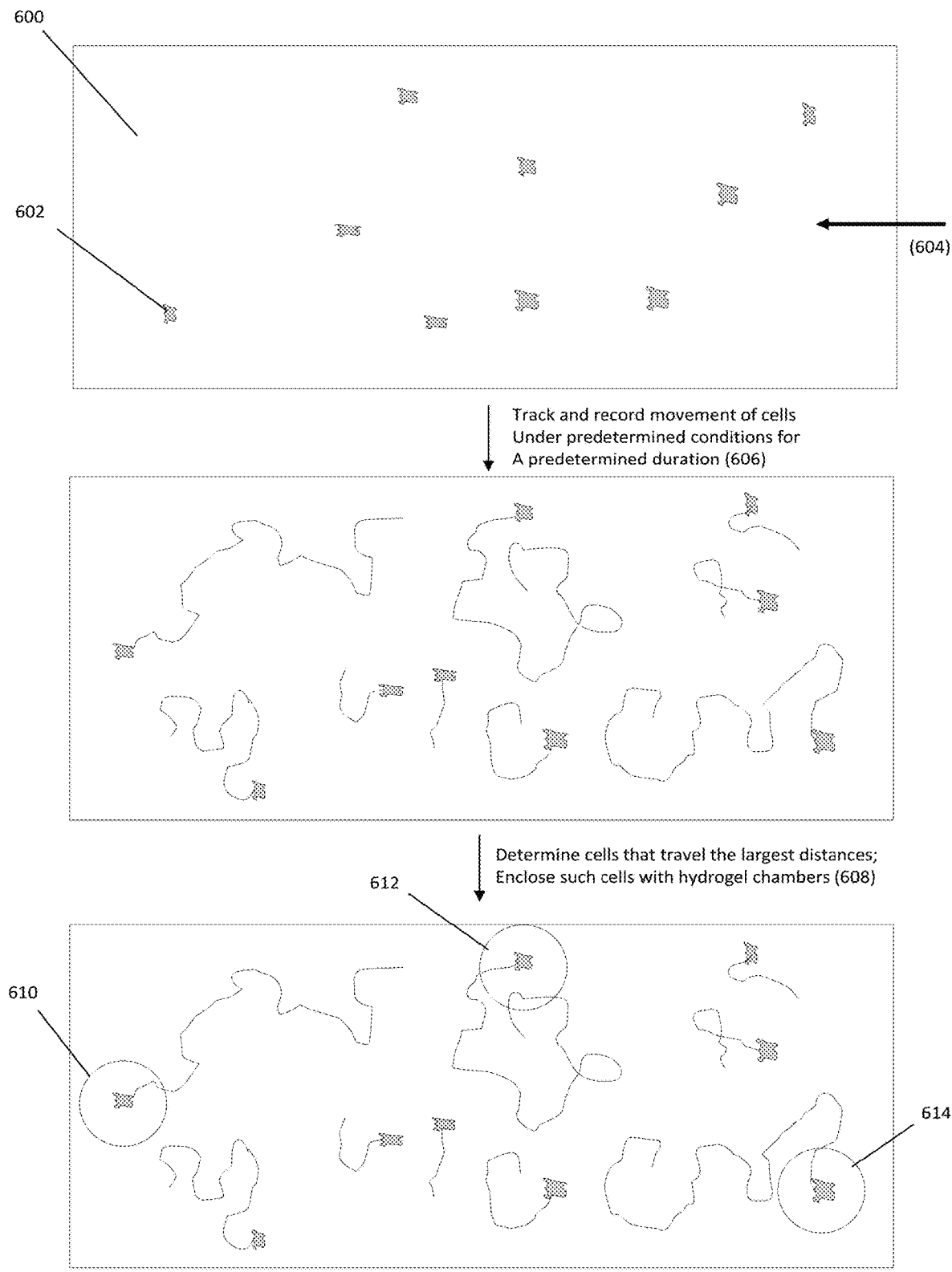
FIGS. 6A-6B illustrate an embodiment for sorting cells that have high migration rates.
Figure 6B:
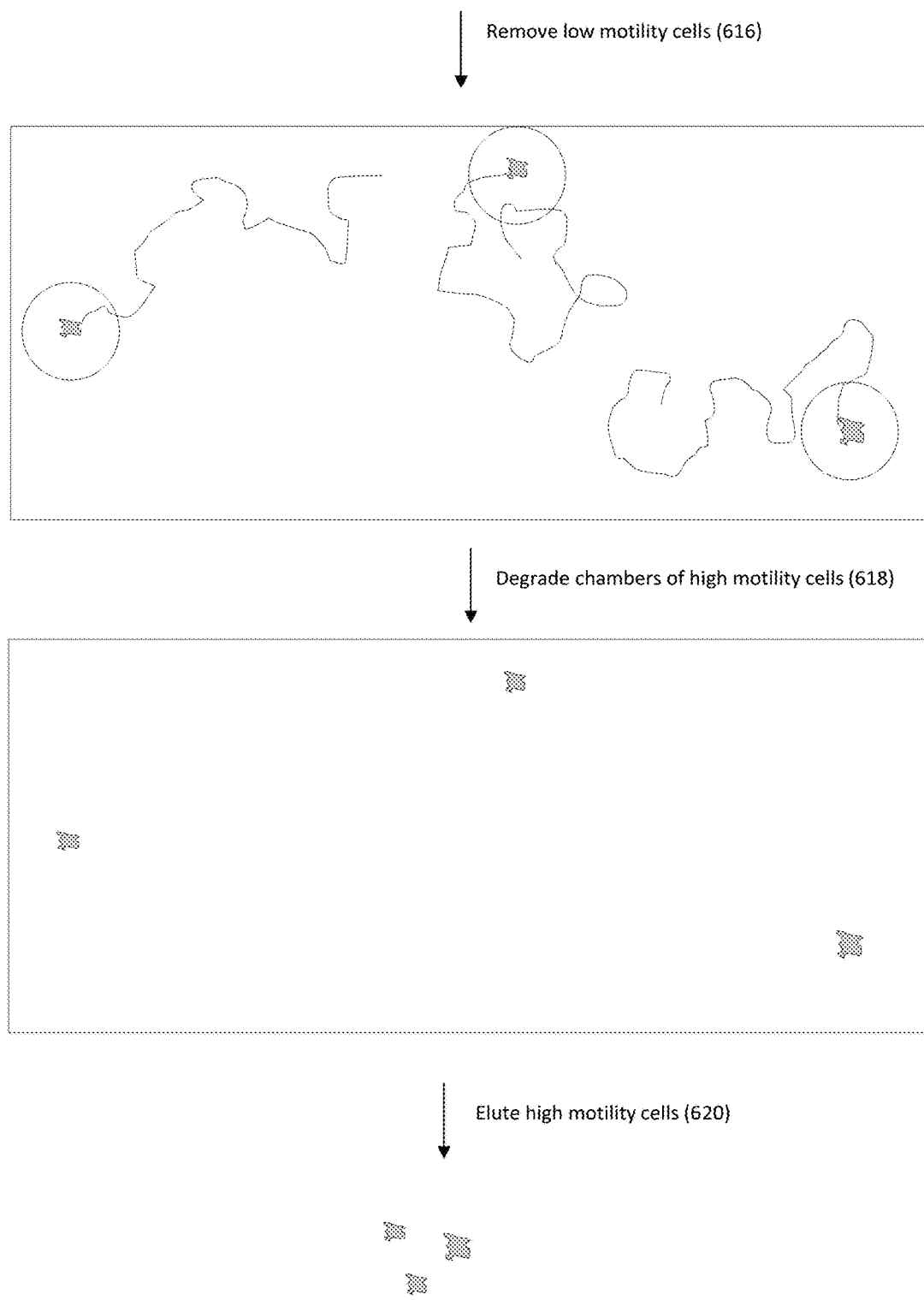

FIGS. 6A-6B illustrates steps of an embodiment for sorting cells based on migration rate. For convenience, FIG. 6A does not include the abstracted perspective view of the imaging and synthesis apparatus as in FIG. 5A, but the steps would employ the same instrumentation. Cells (e.g. 602) are loaded (604) and disposed on surface (600), after which the detector system determines their positions and tracks their movement, as illustrated by the trails in the figure which define a starting position, finishing position and path traversed over a predetermined interval of time. A measure of cellular migration rate may be the length of the path taken by a cell in the predetermined interval. In some embodiments, cells with the highest migration rate are enclosed in hydrogel chambers, e.g. (612), (612) and (614), after which low migration rate cells are removed (616), chambers of high motility cells are degraded (618), and freed high migration rate cells are eluted (620).

Figure 7A:
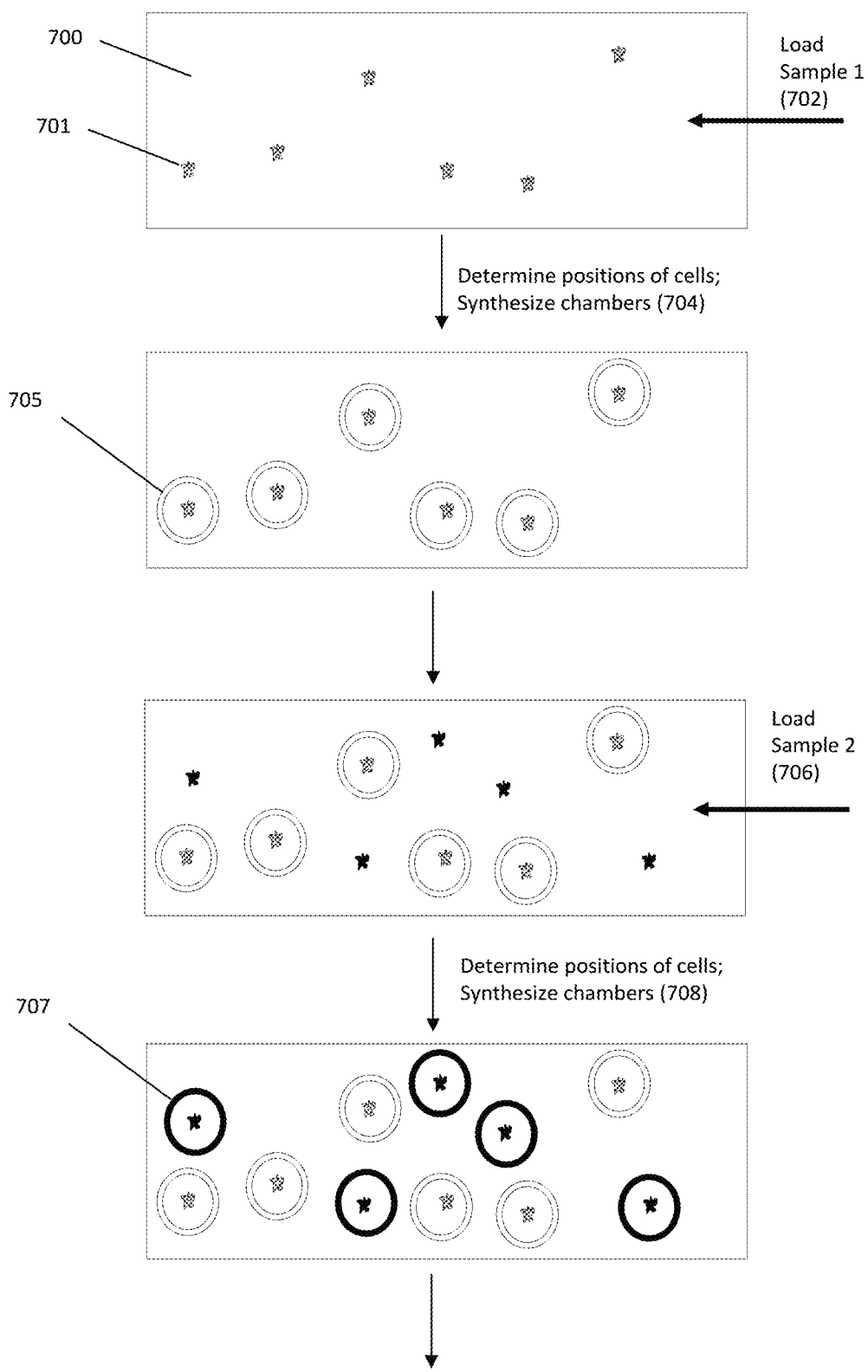
FIGS. 7A-7B illustrate an embodiment for assay multiplexing.
Figure 7B:
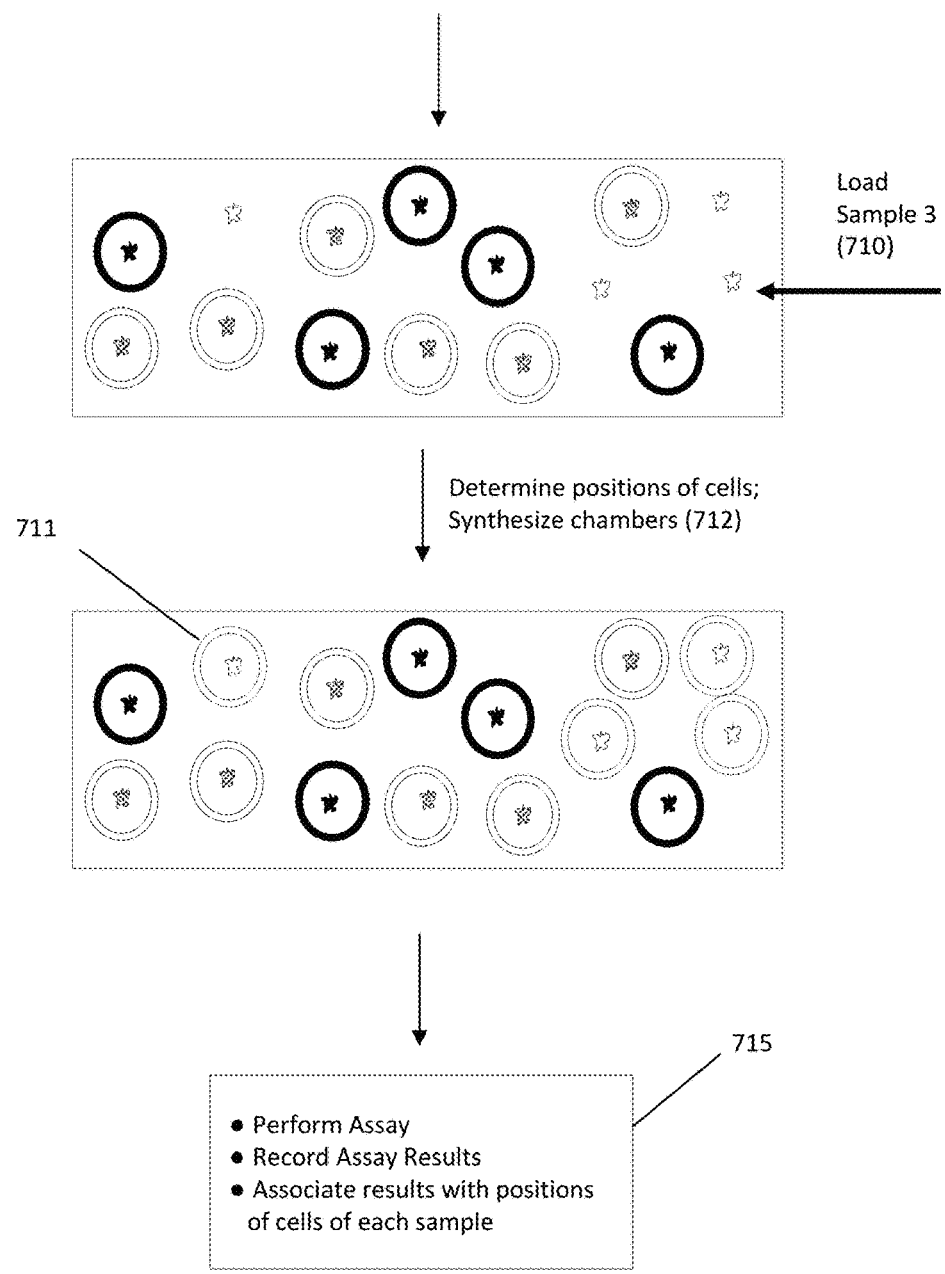

In some embodiments, gel structures may be employed to conduct assays on single cells from multiple samples, as illustrated in FIGS. 7A-7B. Cells from each sample are sequentially loaded, disposed on a surface and enclosed in gel structures whose positions are associated with each sample. In some particular embodiments, gel structures are hydrogel chambers. As with FIG. 6A, FIG. 7A does not include the abstracted perspective view of the imaging and synthesis apparatus as in FIG. 5A, but the steps of this embodiment may employ the same instrumentation. Cells from sample 1 (702) are loaded and disposed (e.g. 701) on surface (700), after which positions of the cells are determined and hydrogel chambers (e.g. 705) synthesized (704). Cells from sample 2 are then loaded (706) and disposed on surface (700), after which positions of the cells are determined and hydrogel chambers (e.g. 707) synthesized. Finally, cells from sample 3 are loaded (710) and disposed on surface (700), after which positions of the cells are determined and hydrogel chambers (e.g. 711) are synthesized (712). After the final hydrogel chambers are synthesized, an assay may be conducted on all three samples simultaneously and assay result associated with specific samples by the positions of the hydrogel chambers.

Assays may include, but are not limited to, assays that measure viability, surface protein expression, cell motility, cell migration rate, cellular replication rate, protein secretion, cytotoxicity, vector copy number of transduced cells, viral integration site, transcriptome, and the like. In some embodiments, the transcriptomes of the enclosed cells is determined. In some embodiments, protein secretion of the enclosed cells is determined. In some embodiments, cytokine secretion of the enclosed cells is determined. In some embodiments, gel structures used to enclose or immobilize cells of a particular sample may be degradable so that, for example, such cells may be eluted or recovered after an assay is performed. In some embodiments, gel structures enclosing or immobilizing at least two samples are degradable using orthogonal methods so that cells of such samples may be separately eluted or recovered. In some embodiments, such orthogonal methods comprise photodegradable gels and chemical degradable gels. In some embodiments, chemical degradable gels comprise disulfide bonds. In some embodiments, chemical degradable gels comprise pH-sensitive bonds.

Figure 7C:
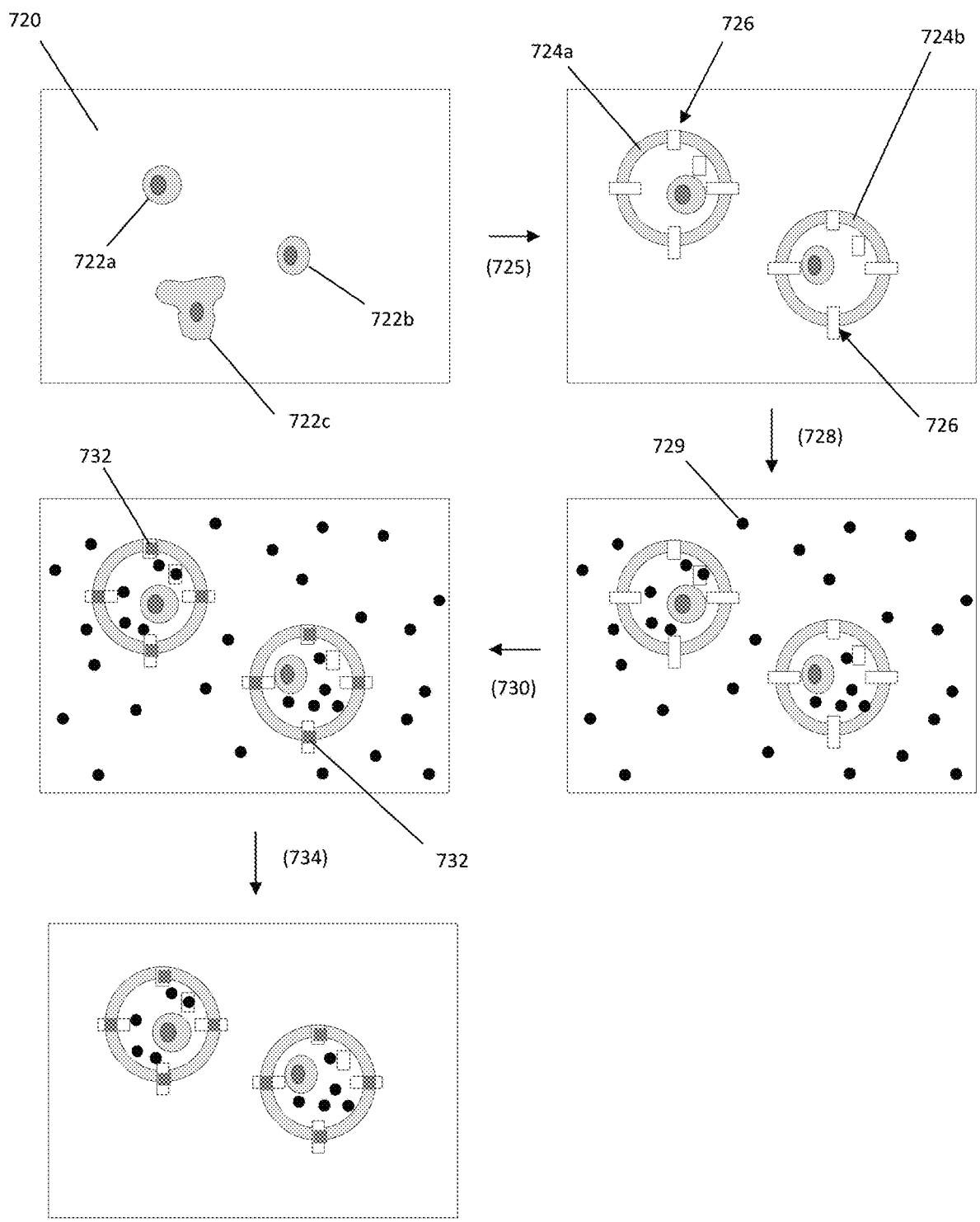
FIG. 7C illustrates an embodiment wherein cells are enclosed by hydrogel chambers comprising two different orthogonally degradable hydrogels.

FIG. 7C illustrates an embodiment wherein cells may be enclosed by hydrogel chambers comprising two or more orthogonally degradable hydrogels. Such embodiments may be employed to expose selected cells to gel-impermeable reagents, such as beads, which may be useful in particular assays, for example, assays for cytokines or other secreted proteins. FIG. 7C shows three cells (722a, 722b and 722c) disposed on a region of surface (720) of a flow cell (not shown). Cells (722a and 722b) are selected based on optical characteristics (e.g. size and shape) and are enclosed (725) by hydrogel chambers (724a and 724b, respectively), wherein the walls of each chamber has gaps (726) of predetermined locations and sizes. Cell (722c) is removed by washing. In some embodiments (such as the one illustrated), the number and size of the gaps are selected so that they are small enough that enclosed cells cannot exit the chambers, but they are large enough and numerous enough that protein-capture beads, e.g. (729), can diffuse into the chambers in operable quantities (i.e. for statistically reliable measurements) in a reasonable time, e.g. less than 24 hours, or less than 8 hours, or less than 4 hours, or less than 2 hours. As shown in FIG. 7C, protein capture beads are loaded into channels of the flow cell (728) so that they are disposed around and inside of hydrogel chambers (e.g., 724a and 724b), after which polymer precursors are again loaded into channels and gaps (732) are closed by photosynthesizing hydrogel in the gaps. As described more fully below, the geometry and size of the initial hydrogel chamber with gaps and the later gap-filling is controlled by a computer actuated spatial energy modulating element, such as a DMD. After gaps are filled, protein-capture beads outside of the chambers may be removed (734) by washing. A protein secretion profile may then be determined from the protein-capture beads inside of the hydrogel chambers, for example, using the protocols of the bead manufacturers.

In the figures, for convenience, hydrogel chambers are illustrated as standing in isolation without connection with adjacent chambers and as having a cylindrical or annular-like shapes; however, a spatial energy modulating element may synthesize chambers of different shapes and sizes, as is useful for particular applications. In some embodiments of the proliferation assay, each hydrogel chamber synthesized has the same shape and area, for example, annular-like with an interior area selected from the range of 0.001 to 0.01 mm$^2$.

As used herein, "channel" means a container capable of holding fluid (which may be static or flowing) and having at least one surface on which beads may be disposed and chambers synthesized. In some embodiments, a channel may have a first surface and/or a second surface on which chambers may be synthesized and/or on which beads or particles may be disposed. As used herein, reference to a "surface" without reference to "first" or "second" is intended to comprise a first surface or a second surface (if two are present in a fluidics device, e.g. comprising a flow cell). In some embodiments, a channel may constrain a flow of fluid therethrough from an inlet to an outlet. In other embodiments, a channel may comprise a non-flowing volume of fluid that may be removed, replaced or added to by way of an opening or inlet; that is, in some embodiments, a channel may be a well or a well-like structure.

Systems and Instrumentation

Figure 8A:
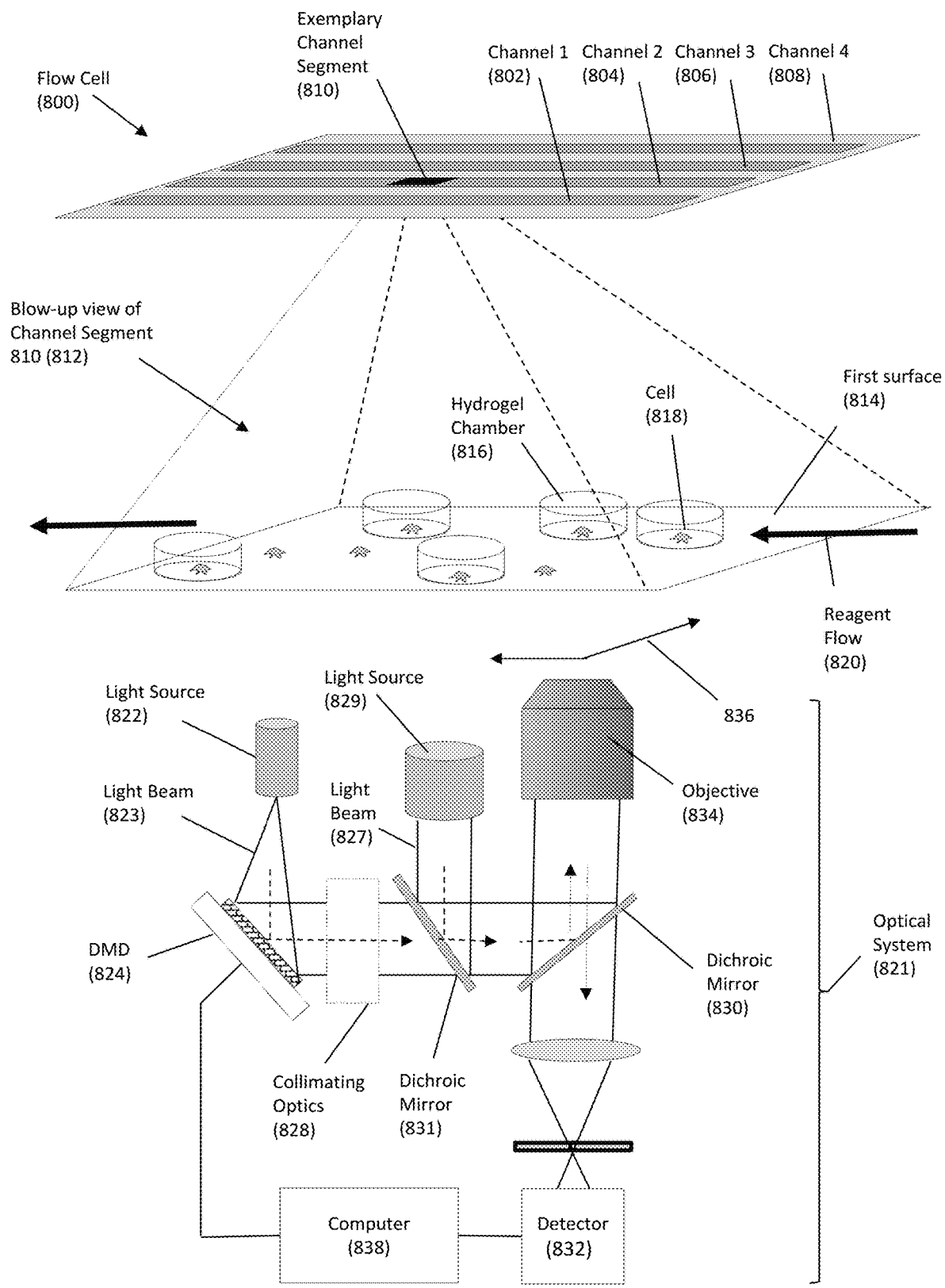
FIGS. 8A-8B illustrate an apparatus for implementing embodiments of the systems and methods described herein.

A system for carrying out the above method is illustrated in FIG. 8A. Flow cell (800) is a component of a fluidic device that provides one or more channels and liquid handling components under programmable control for delivering beads and reagents to the channels. In this illustration, four channels (802, 804, 806, and 808) are shown, with blow-up view (812) of segment (810) of channel 2 (804) shown below. In the abstracted view of flow cell (800) of FIG. 8A, inlets, outlets and other features of the channels are not shown. On first surface (814) of channel 2 (804) a plurality of beads, e.g. (818), are each enclosed by a hydrogel chamber, e.g. (816). In some embodiments, the porosity of polymer matrix walls of the hydrogel chambers is selected to be impermeable to the beads, but permeable to reagents for forming spatial barcodes. Thus, reagents may be introduced to, and removed from, the interiors of the hydrogel chambers by flowing (820) them through the channels, but beads are retained inside. Below blow-up (812) of channel segment (810) is shown an optical system (821) for photosynthesizing hydrogel chambers at the locations of beads in the channels. One of ordinary skill in the art would recognize that optical systems with different configurations than those of FIGS. 8A and 8B may be employed for carrying out these functions. In some embodiments, one or more DMD-objective subsystems for synthesizing hydrogel structures may be employed to increase the speed of synthesis by synthesizing multiple structures simultaneously.

Returning to FIG. 8A, for photosynthesizing the hydrogel chambers, light source (822) generates light beam (823) of appropriate wavelength light (e.g. UV light) that passes through an appropriate photo-mask or beam-shaping or beam steering (Galvo) system for shaping a beam to synthesize a desired structure or structures in a channel. In some embodiments, a digital micromirror device (DMD) (824) is employed, in other embodiments, a physical photo-mask may be employed. Chamber position, shape and polymer matrix wall thickness is determined at least in part from bead position information determined from images collected by detector (832). Reflected light from DMD (824) is shaped using conventional optics, e.g. collimating optics (828), and is directed through objective lens system (834) into channel 2 segment (810). Objective (834) and flow cell (800) move relative to one another in the xy-directions (836) to photosynthesize chambers at any position in any of the channels. In some embodiments, flow cell (800) moves and optical system (821) is stationary. In some embodiment, objective (834) may also direct light beam (827) from light source (829) to targets, such as cells, on first surface (814) and collect optical signals, such as fluorescent signals, from assays taking place on first surface (814). Alternatively, optical signal collection may be carried out with a separate objective as shown if FIG. 8B. Information collected by detector (832), or its counterpart in the embodiment of FIG. 8B, particularly cellular positions in their respective channels, is employed by computer (838) and/or subsidiary controllers to direct DMD (824) and translation devices controlling the relative positions of objective (834) and flow cell (800) to synthesize hydrogel chambers of the appropriate shape and size at the appropriate locations.

Figure 8B:
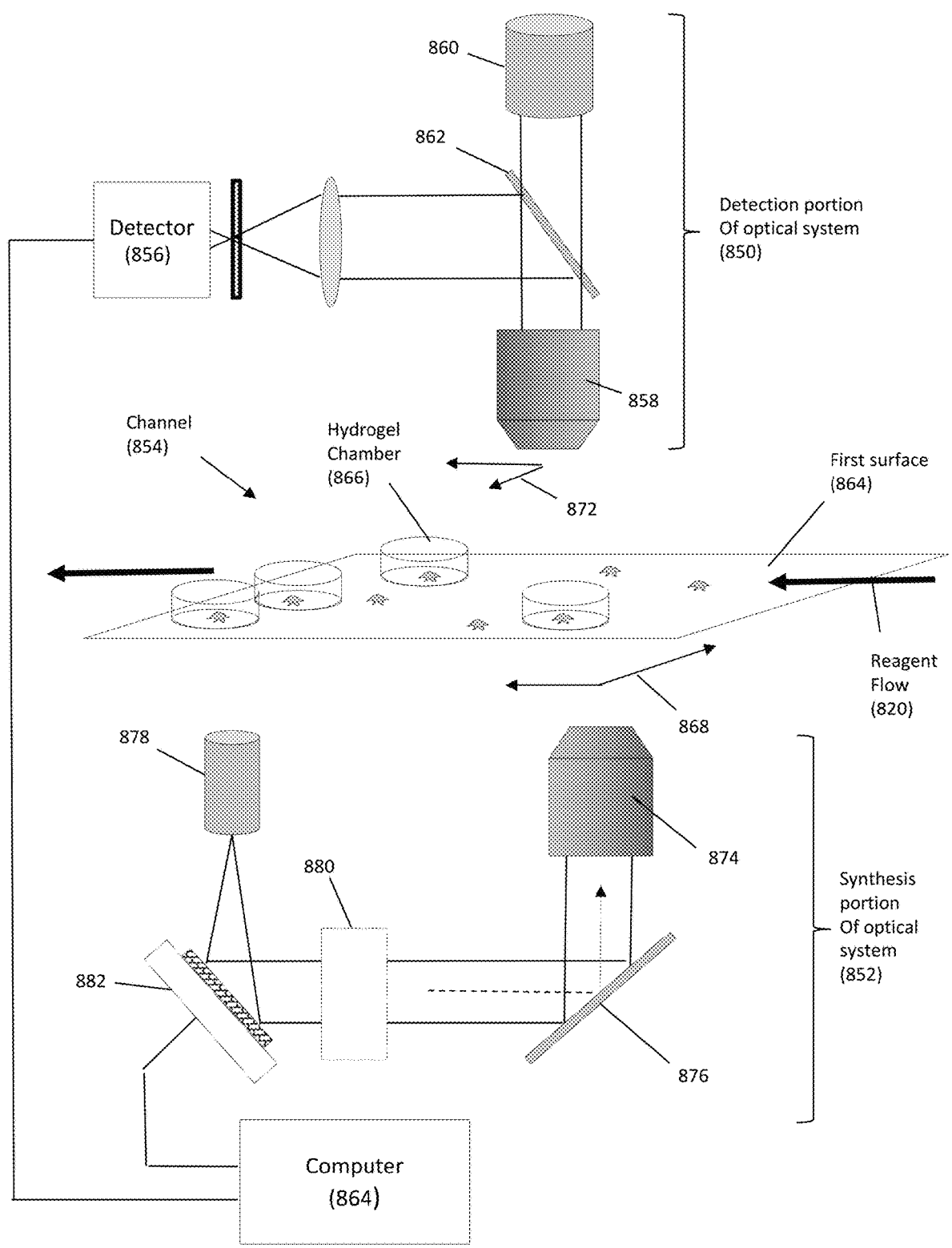

FIG. 8B illustrate an alternative optical system in which the detection portion (850) of the optical system moves (872) independently from the movement (868) of the synthesis portion (852) of the optical system. Detection portion (850) of the optical system comprises detector (856), objective (858), light source (860) and interconnecting optical elements, such as dichroic mirror (862). As with the embodiment of FIG. 8A, detector (856) is operationally associated with computer (864) and the synthesis portion (852) of the optic system to provide synthesis portion (852) with bead position information. Computer (864) and (838) are also in operationally associated with stages and/or motors controlling the relative positions of the objectives of the optical systems and the position of the flow cell. In this embodiment, synthesis portion (852) of the optical system is located on the other side of first surface (864) from detection portion (850). As with the embodiment of FIG. 8A, it comprises the conventional components objective (874), mirror (876), collimating optics (880), DMD (882) and light source (878).

In some embodiments, the systems described herein comprise (i) a channel comprising a surface, (ii) a spatial energy modulation element in optical communication with the surface, and (iii) a detector in optical communication with the surface and in operable association with the spatial energy modulating element, the detector identifying cells and determining positions thereof on the surface. It is understood that the term "detector" as used herein may include, but not be limited by, a microscope element that collects and optionally magnifies an image of a portion of a channel and an image analysis element that comprises software for identifying cells and associated position information. A computer element uses such information generated by a detector together with user input to generate commands for other elements, such as, the spatial energy modulating element to carry out a variety of functions including, but not limited to, synthesizing chambers, "on-demand" degrading of chambers, selectively photo-degrading chambers, and the like. Configurations of such embodiments are illustrated in FIGS. 8A-8B which are described above. In some embodiments, a channel of a fluidic device further comprises a second surface (e.g. illustrated in FIG. 2) wherein said first surface and the second surface are disposed opposite one another across the channel, and wherein the polymer matrix walls of the chambers extend from the first surface to the second surface to form chambers each having an interior. In some embodiments, chambers in a channel each enclose a single cell. In some embodiments both the first wall and the second wall are made of optically transmissive materials, such as, glass, plastic, or the like, and are positioned so that the first surface and second surface are substantially parallel to one another. The perpendicular distance between a first surface and a second surface may be in the range of from 10 μm to 500 μm, or in the range of from 50 μm to 250 μm.

Figure 9A:
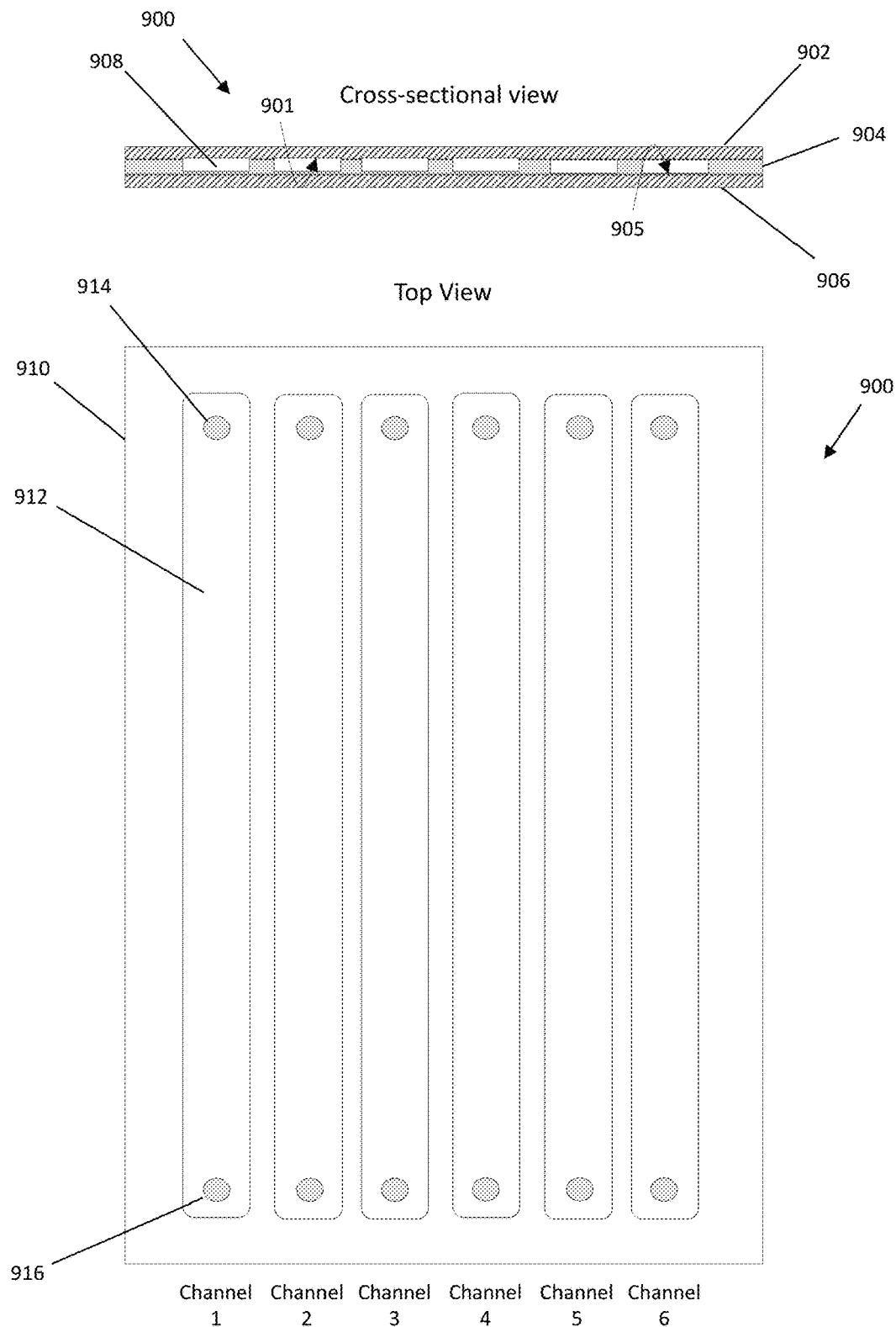
FIGS. 9A-9B illustrate a multi-channel flow cell for use with embodiments of the systems and methods described herein.
Figure 9B:
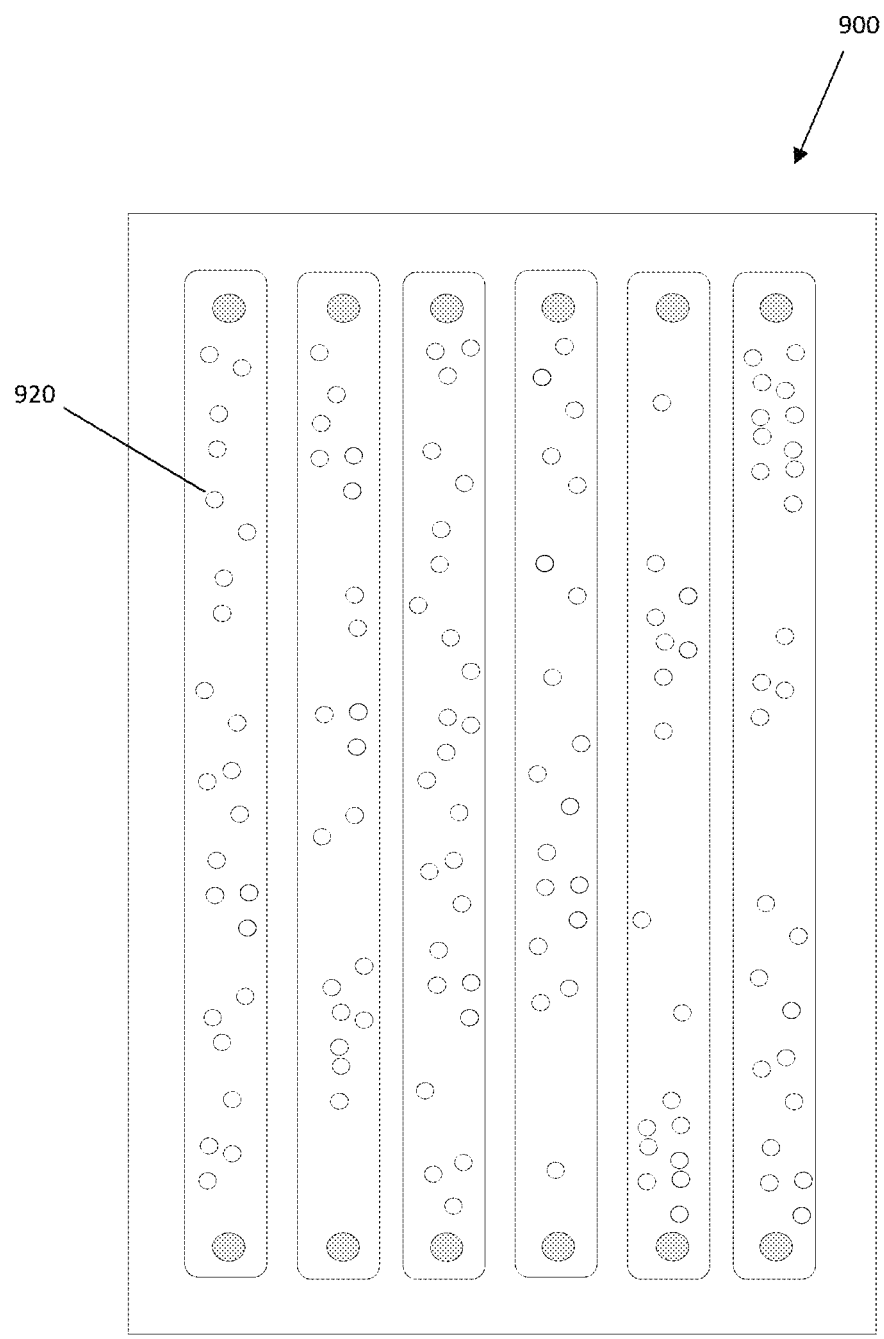

In some embodiments, a plurality of channels may be arranged together in a flow channel as illustrated in FIGS. 9A-9B. In some embodiments, the plurality of channels may be in the range of from 2 to 12, or from 2 to 8, or from 2 to 6, or in the range of from 2 to 4. Flow cell (900) is shown in a cross-sectional view and a top view. Flow cell (900) has bottom, or first, wall (906) with first surface (905); top, or second, wall (902) with second surface (901); and sandwiched sealingly therebetween spacer (904) whose longitudinal holes form channels 1-6, one of which is indicated by (908) in the cross-sectional view, and by (912) in the top view. In some embodiments, spacer (904) may have a thickness in the range of from 10 μm to 500 μm, or in the range of from 50 μm to 250 μm, which determines the interior height of the channels. Top wall (902) comprises inlets (914) and outlets (916) for either separately or jointly loading and removing reagents and beads from channels 1-6. In some embodiments, at least one of walls (902) and (906) are made of light transmissive materials, such as glass, plastic, or the like. Flow cell (900) may be operationally associated with a fluidic device that delivers reagents and beads to any of channels 1-6 under programmed control. Guidance for particular designs, including fluid handling and valving for such fluidic systems may be found in U.S. Pat. Nos. 8,921,073; 8,173,080; 8,900,828; and the like, which are incorporated herein by reference. FIG. 9B illustrates channels of flow cell (900) with random distributions (not to scale) of hydrogel chambers with annulus-like cross-sections, such as (920), on their first surfaces.

As noted above, any of first surfaces, second surfaces or polymer matrix wall of chambers may comprise capture elements and other functional groups for carrying out a variety of operations including, but not limited to, capturing beads, capturing cells, capturing analytes (such as, mRNA, secreted proteins, intracellular proteins, or genomic sequences), capturing constituents of analytical reagents (such as, oligonucleotide labels from antibodies), and the like. Derivatizing surfaces for such purposes is well-known to those skilled in the art, as evidenced by the following references: Integrated DNA Technologies brochure (cited above); Hermanson (cited above); and the like.

As noted above, in some embodiments, a fluidic device of the method comprises or is operationally associated with a detector that either may share an optical path of the spatial energy modulating element or may be disposed adjacent to the second wall or opposite the first wall from the spatial energy modulating element in embodiments, such as wells, that have only a first wall and first surface. The detector is positioned so that it is capable of detecting optical signals from or adjacent to cells in the channel, for example, distributed over the first surface in chambers. In some embodiments, the first and second walls each comprise optically transmissive material, for example, so that a spatial energy modulating element may project light energy to the interior of the channel, and so that a detector may detect optical signals, such as fluorescent emissions or reflected light from biological components. In some embodiments, the projected energy from the spatial energy modulating element is a light energy from a light beam. In some embodiments, the light beam projected by the spatial energy modulating element may have a complex cross-section that permits (in various embodiments) the simultaneous synthesis of a plurality of chambers. Optically transmissive materials include, but are not limited to, glass, quartz, plastic, and like materials.

Spatial energy modulating elements may use light energy for polymerization may comprise physical photomasks or virtual photomask, such as, a digital micromirror device (DMD). The following references, which are hereby incorporated by reference, provide guidance in selecting and operating a DMD for photopolymering gels: Chung et al, U.S. Pat. No. 10,464,307; Hribar et al, U.S. Pat. No. 10,351,819; Das et al, U.S. Pat. No. 9,561,622; Huang et al, Biomicrofluidics, 5: 034109 (2011); and the like.

Hydrogel Chambers

Function. A wide variety of photo-synthesizable gels may be used in connection with the systems and methods described herein. In some embodiments, hydrogels are used in particular because of their compatibility with living cells and the versatility of formulating gels with desired properties including, but not limited to, porosity (which in large part determines what is contained and what is passed by a gel (or polymer matrix) wall, degradability, mechanical strength, ease and speed of synthesis, and the like. In some embodiments, gels or hydrogels are both photo-synthesizable and photo-degradable. In some embodiments, gel degradation mechanisms are compatible with living cells. In some embodiments, synthesis of gel chambers or gel walls may be used directly for size selecting cells, i.e. independently, or in conjunction with, imaging. Hydrogel chambers or other hydrogel structures, such as barriers or walls may be synthesized in a channel with gaps in the polymer matrix walls of a predetermined size so that smaller cells may pass through the gaps but larger cells are blocked and retained on one side of the barriers or walls.

Porosity. In some embodiments, hydrogel porosity is selected to permit passage of selected reagents while at the same time preventing the passage of other reagents or objects, such as, a cell. In some embodiments, hydrogel porosity is selected to prevent the passage of biological cells but to permit the passage of reagents, including proteins, such as polymerases. In some embodiments, such reagents permeable to a polymer matrix wall comprise lysozyme, proteinase K, random hexamers, polymerases, transposases, ligases, deoxynucleotide triphosphates, buffers, cell culture media, or divalent cations. In some embodiments, the at least one polymer matrix comprises pores that are sized to allow diffusion of a reagent through the at least one polymer matrix but are too small to allow DNA or RNA for analysis to traverse the pores (having a size of greater than 100 nucleotides or basepairs, or greater than 300 nucleotides or basepairs). In some embodiments, crosslinking the polymer chains of the hydrogel structure forms a hydrogel matrix having pores (i.e., a porous hydrogel matrix). In some versions, the size of the pores in the hydrogel structures may be regulated or tuned and may be formulated to encapsulate sufficiently large genetic material, such as cells or nucleic acids (e.g., of greater than about 300 base pairs), but to allow smaller materials, such as reagents, or smaller sized nucleic acids (e.g., of less than about 50 base pairs), such as primers, to pass through the pores, thereby passing in and out of the hydrogel structures. In some embodiments, the hydrogels can have any pore size having a diameter sufficient to allow diffusion of the above-listed reagents through the structure while retaining the nucleic acid molecules greater than 500 nucleotides or basepairs in length. In some embodiments, the hydrogel structure can be swollen when the hydrogel is hydrated. The sizes of the pores can then change depending on the water content in the hydrogel of the hydrogel structure. In some embodiments, the pores have a diameter of from about 10 nm to about 100 nm. In some embodiments, the pore size of the hydrogel structures is tuned by varying the ratio of the concentrations of polymer precursors to the concentration of crosslinkers, varying pH, salt concentrations, temperature, light intensity, and the like, by routine experimentation. In some embodiments, the average diameter of pores of a polymer matrix wall prevent passage of molecules having a molecular weight of 25 kiloDaltons (kDa) or greater; or having a molecular weight of 50 kDa or greater; or having a molecular weight of 75 kDa or greater; or having a molecular weight of 100 kDa or greater; or having a molecular weight of 150 kDa or greater.

In some embodiments, DNA or RNA retained have lengths that are sequencable using conventional sequencing-by-synthesis techniques. For example, such DNA or RNA comprise at least 50 nucleotides, or in some embodiments, at least 100 nucleotides. In some embodiments, the pores may have an average diameter from 5 nm to 100 nm. In some embodiments, the pores may have an average diameter from 5 nm to 10 nm, 10 nm to 20 nm, 20 nm to 30 nm, 30 nm to 40 nm, 50 nm to 60 nm, 60 nm to 70 nm, 70 nm to 80 nm, 80 nm to 90 nm, 90 nm to 100 nm. In some embodiments, the pores may have an average diameter larger than 100 nm. In some embodiments, the pores may have an average diameter smaller than 5 nm. The reagent may comprise an enzyme or a primer having a size of less than 50 base pairs (bp). A primer may comprise a single-stranded DNA (ssDNA). In some embodiments, a primer may have a size from 5 bp to 50 bp. In some embodiments, a primer may have a size from 5 bp to 10 bp, 10 bp to 20 bp, from 20 bp to 30 bp, 30 bp to 40 bp, or 40 bp to 50 bp. In some embodiments, a primer may have a size of more than 50 bp. In certain cases, a primer may have a size of less than 5 bp. In some embodiments, the pores may have a diameter from 5 nm to 100 nm. In some embodiments, the pores may have a diameter from 5 nm to 10 nm, 10 nm to 20 nm, 20 nm to 30 nm, 30 nm to 40 nm, 50 nm to 60 nm, 60 nm to 70 nm, 70 nm to 80 nm, 80 nm to 90 nm, 90 nm to 100 nm. In some embodiments, the pores may have a diameter larger than 100 nm. In some embodiments, the pores may have an average diameter smaller than 5 nm. The polymer matrix may have a pore size of about 5 nanometers (nm) to about 100 nm. The polymer matrix may have a pore size of about 5 nm to about 10 nm, about 5 nm to about 20 nm, about 5 nm to about 30 nm, about 5 nm to about 40 nm, about 5 nm to about 50 nm, about 5 nm to about 60 nm, about 5 nm to about 70 nm, about 5 nm to about 80 nm, about 5 nm to about 90 nm, about 5 nm to about 100 nm, about 5 nm to about 110 nm, about 10 nm to about 20 nm, about 10 nm to about 30 nm, about IO nm to about 40 nm, about 10 nm to about 50 nm, about 10 nm to about 60 nm, about 10 nm to about 70 nm, about 10 nm to about 80 nm, about 10 nm to about 90 nm, about 10 nm to about I 00 nm, about 10 nm to about 110 nm, about 20 nm to about 30 nm, about 20 nm to about 40 nm, about 20 nm to about 50 nm, about 20 nm to about 60 nm, about 20 nm to about 70 nm, about 20 nm to about 80 nm, about 20 nm to about 90 nm, about 20 nm to about 100 nm, about 20 nm to about 110 nm, about 30 nm to about 40 nm, about 30 nm to about 50 nm, about 30 nm to about 60 nm, about 30 nm to about 70 nm, about 30 nm to about 80 nm, about 30 nm to about 90 nm, about 30 nm to about I 00 nm, about 30 nm to about 110 nm, about 40 nm to about 50 nm, about 40 nm to about 60 nm, about 40 nm to about 70 nm, about 40 nm to about 80 nm, about 40 nm to about 90 nm, about 40 nm to about I 00 nm, about 40 nm to about 110 nm, about 50 nm to about 60 nm, about 50 nm to about 70 nm, about 50 nm to about 80 nm, about 50 nm to about 90 nm, about 50 nm to about 100 nm, about 50 nm to about 110 nm, about 60 nm to about 70 nm, about 60 nm to about 80 nm, about 60 nm to about 90 nm, about 60 nm to about 100 nm, about 60 nm to about 110 nm, about 70 nm to about 80 nm, about 70 nm to about 90 nm, about 70 nm to about 100 nm, about 70 nm to about 110 nm, about 80 nm to about 90 nm, about 80 nm to about 100 nm, about 80 nm to about 110 nm, about 90 nm to about 100 nm, about 90 nm to about 110 nm, or about 100 nm to about 110 nm. The polymer matrix may have a pore size of about 5 nm, about 10 nm, about 20 nm, about 30 nm, about 40 nm, about 50 nm, about 60 nm, about 70 nm, about 80 nm, about 90 nm, about 100 nm, or about 110 nm. The polymer matrix may have a pore size of at least about 5 nm, about 10 nm, about 20 nm, about 30 nm, about 40 nm, about 50 nm, about 60 nm, about 70 nm, about 80 nm, about 90 nm, about 100 nm, or less. The polymer matrix may have a pore size of at most about 10 nm, about 20 nm, about 30 nm, about 40 nm, about 50 nm, about 60 nm, about 70 nm, about 80 nm, about 90 nm, about 100 nm, about 110 nm, or more.

Size and Shape of Hydrogel Chambers. In some embodiments, a polymer matrix wall of a chamber inhibits passage of a predetermined component, such as a mammalian cell, a bacterial cell, genomic DNA, larger polynucleotides (e.g. mRNA greater than 200 ribonucleotides, or greater than 300 ribonucleotides, or 500 ribonucleotides, or the like. In some embodiments, a polymer matrix wall extends from the first surface to a second surface (parallel to the first surface) to form a chamber within a channel. In some embodiments, a chamber has polymer matrix walls and an interior. In some embodiments, the interior of a chamber is sized for enclosing a cell, such as a mammalian cell. For example, such chamber may comprise a cylindrical shell or a polygon shell, comprising an inner space, or interior and a polymer matrix wall. In some embodiments, such chambers have annular-like cross-sections. As used herein, the term "annular-like cross-section" means a cross-section topologically equivalent to an annulus. In some embodiments, the inner space, or interior, of a chamber has an inner diameter from 1 µm to 500 µm and a volume in the range of from 1 pico liter to 200 nano liters, or from 100 pico liters to 100 nano liters, or from 100 picoliters to 10 nano liters. In some embodiments, the polymer matrix wall has a thickness of at least 1 µm (micrometer). In some embodiments, the height of a chamber with an annular-like cross section have a value in the range of from 10 µm to 500 µm, or in the range of from 50 µm to 250 µm. In some embodiments, a polymer matrix wall having an annular-like cross-section has an aspect ratio (i.e., height/width) of 1 or less. In some embodiments, aspect ratio and polymer matrix wall thickness are selected to maximize chamber stability against forces, such as reagent flow through the channel, washings, and the like. In some embodiments, the at least one polymer matrix wall is a hydrogel wall. In some embodiments, the at least one polymer matrix is degradable. In some embodiments, the degradation of the at least one polymer matrix is "on demand." In some embodiments, chambers in a channel are non-contiguous. In some embodiments, chambers in a channel may be contiguous with adjacent chambers. In some embodiments, chambers may share polymer matrix walls with one another. In some embodiments, chambers may be synthesized with slits or other orifaces large enough to permit passage of certain components, e.g. beads, but small enough to prevent passage of other components, e.g. cells.

Hydrogel Compositions. As mentioned above, hydrogel compositions may vary widely and hydrogels may be formed by a variety of methods. Biocompatible hydrogel precursors comprise, but are not limited to, hyaluronic acid, chitosan, heparin, alginate, polyethylene glycol (PEG), multi-arm PEG, poly(ethylene glycol)-b-poly(propylene oxide)-b-poly(ethylene glycol) (PEG-PPO-PEG), poly(lactic acid-co-glycolic acid)-b-poly(ethylene glycol)-b-poly (lactic acid-co-glycolic acid) (PLGA-PEG-PLGA), and poly (vinyl alcohol). In some embodiments, hydrogels are formed by photo-initiated free radical crosslinking. In some embodiments, hydrogels are formed by photo-initiated thiol-ene reactions.

Hydrogel Degradation. In some embodiments, hydrogel chambers are degradable or depolymerizable either generally within a channel or "on demand" within a channel. Hydrogel chambers that are generally degradable are degraded by treatment with a degradation agent, or equivalently, a depolymerization agent that is exposed to all chambers within channel. Depolymerization agents may include, but are not limited to, heat, light, and/or chemical depolymerization reagents (also sometimes referred to a cleaving reagents or degradation reagents). In some embodiments, on demand degradation may be implemented using polymer precursors that permit photo-crosslinking and photo-degradation, for example, using different wavelengths for crosslinking and for degradation. For example, Eosin Y may be used for radical polymerization at defined regions using 500 nm wavelength, after which illumination at 380 nm can be used to cleave the cross linker. In other embodiment, photo-caged hydrogel cleaving reagents may be included in the formation of polymer matrix walls. For example, acid labile crosslinkers (such as esters, or the like) can be used to create the hydrogel and then UV light can be used to generate local acidic conditions which, in turn, degrades the hydrogel. In some embodiments, the at least one polymer matrix is degradable by at least one of: (i) contacting the at least one polymer matrix with a cleaving reagent; (ii) heating the at least one polymer matrix to at least 90° C.; or (iii) exposing the at least one polymer matrix to a wavelength of light that cleaves a photo-cleavable cross linker that cross links the polymer of the at least one polymer matrix. In some embodiments, the at least one polymer matrix comprises a hydrogel. In some embodiments, the cleaving reagent degrades the hydrogel. In some embodiments, the cleaving reagent comprises a reducing agent, an oxidative agent, an enzyme, a pH based cleaving reagent, or a combination thereof. In some embodiments, the cleaving reagent comprises dithiothreitol (DTT), tris(2-carboxyethyl) phosphine (TCEP), tris(3-hydroxypropyl)phosphine (THP), or a combination thereof. In some embodiments, the surface of the polymer matrix or hydrogel may be functionalized by coupling a functional group to the polymer matrix or hydrogel. Some nonlimiting examples of functional group may include a capture reagent (e.g., pyridinecarboxaldehyde (PCA)), an acrylamide, an agarose, a biotin, a streptavidin, a strep-tag II, a linker, a functional group comprising an aldehyde, a phosphate, a silicate, an ester, an acid, an amide, an aldehyde dithiolane, PEG, a thiol, an alkene, an alkyne, an azide, or a combination thereof. In some cases, the functionalized polymer matrix may be used to capture biomolecules inside a polymer matrix compartment formed adjacent to (e.g., around or on) the biological component. The biomolecule may be produced by the biological component (e.g., secretome from a cell). The functionalized surface of the polymer matrix inside the compartment may be used to capture reagents or molecules from outside the compartment. The functionalized surface may increase surface area covered by a reagent, a molecular sensor, or any molecule of interest (e.g., an antibody).

Photosynthesis. In some embodiments, the generation of a polymer matrix within a channel or well of a fluidic device comprises exposing the one or more polymer precursors to an energy source. In some embodiments, the energy source is a light generating device. In some embodiments, the light generating device generates light at 350 nm to 800 nm. In some embodiments, the light generating device generates light at 350 nm to 600 nm. In some embodiments, the light generating device generates light at 350 nm to 450 nm. In some embodiments, the light generating device generates UV light. In some embodiments, the generation of a polymer matrix within said fluidic device is performed using a spatial light modulator (SLM) (i.e. a spatial energy modulation element that is capable of generating desired light intensity pattern spatially). In some embodiments, the SLM is a digital micromirror device (DMD). In some embodiments, the SLM is a laser beam steered using a galvanometer. In some embodiments, the SLM is liquid-crystal based.

While the present invention has been described with reference to several particular example embodiments, those skilled in the art will recognize that many changes may be made thereto without departing from the spirit and scope of the present invention. The present invention is applicable to a variety of sensor implementations and other subject matter, in addition to those discussed above.

Example: Sorting CD56-Expressing NK Cell From a Mixed NK/Jurkat Population

Figure 10A:
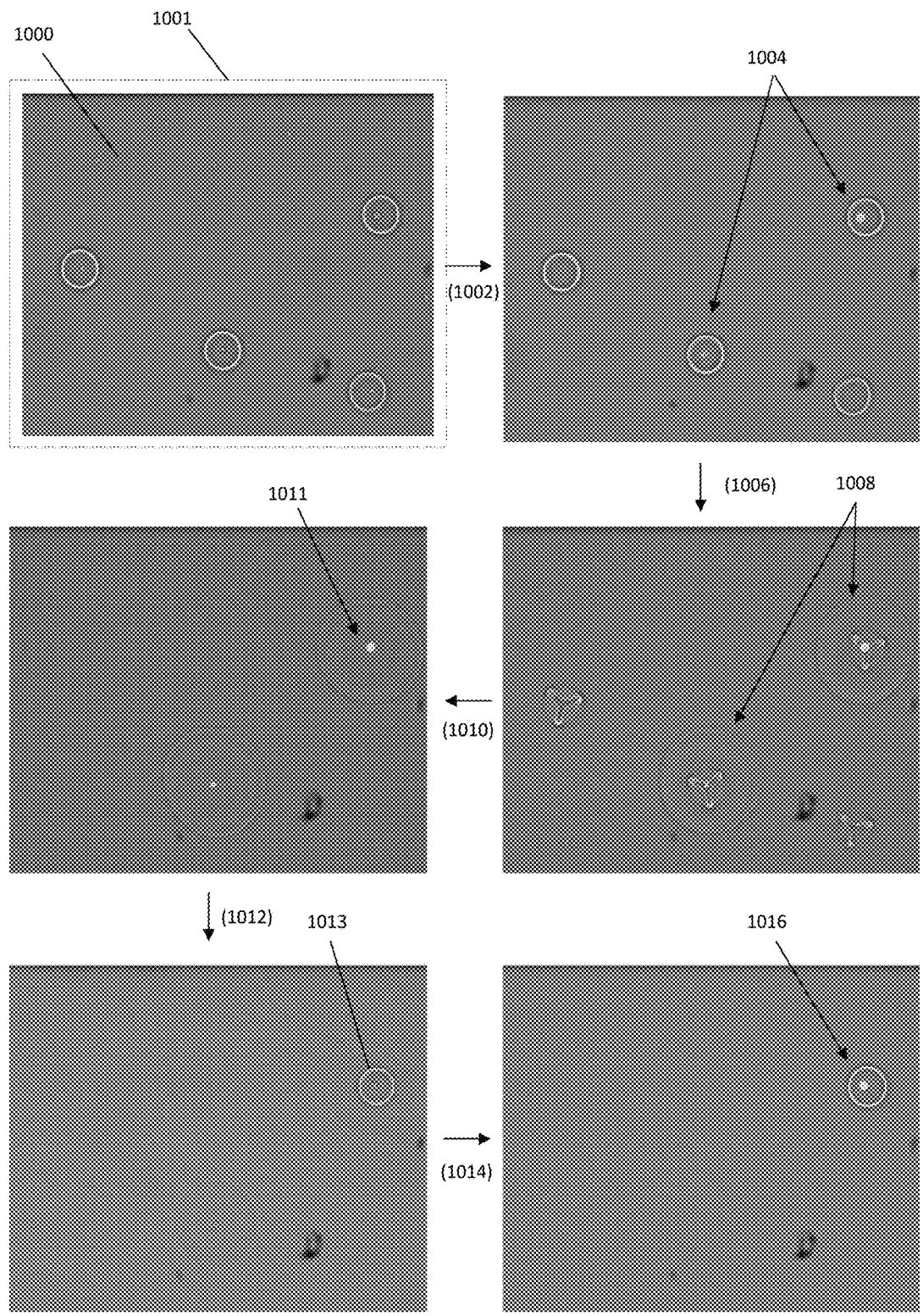
FIGS. 10A-10B show data related to using two orthogonally degradable hydrogels to select and sort particular cells based on optical characteristics.

In this Example, high CD56-expressing NK cells are sorted from a mixed NK/Jurkat cell population. Exemplary results are shown in FIG. 10A. A mixed population of NK cells and Jurkat cells was loaded into a flow cell so that cells settled on surface (1000), as shown in field of view (1001), after which hydrogel chamber were synthesized around the four cells as indicated using cPEG (described more fully below). Cells were stained (1002) with an anti-CD56 PE-labeled antibody and cells (1004) expressing high levels of CD56 were identified by fluorescence intensity. High CD56-expressing cells were again enclosed by a second orthogonally degradable hydrogel, cSEL (1008, as described more fully below), after which all of the cPEG hydrogels were degraded (1006) using glutathione (GSH) (as described below). Cells not enclosed by cSEL chambers were removed (1010) by washing. The high CD56-expressing cells were identified (1011), after which (i) they were enclosed (1012) in another cPEG chamber (1013), (ii) cSEL hydrogels were degraded, and (iii) other cells were removed (1014) by washing to leave high CD56-expressing cells, such as (1016).

Figure 10B:
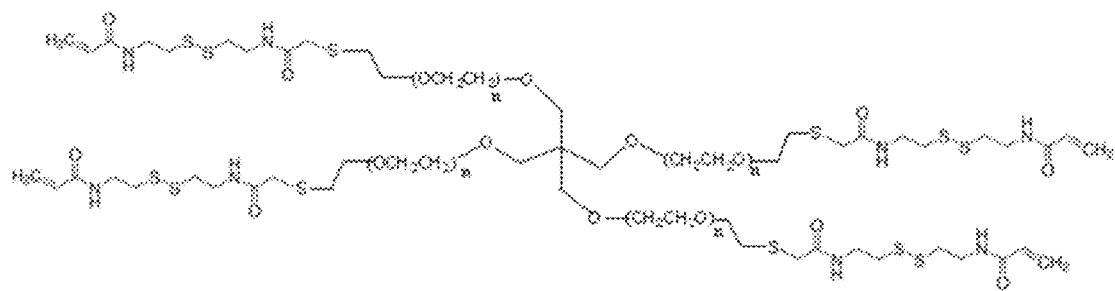
Figure 10B:
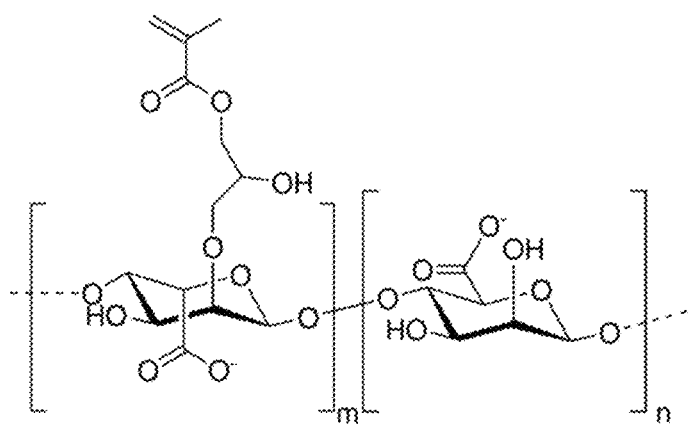

Materials and methods used in the Example were as follows:

Cells: Jurkat cells and NK cells were cultured in separate tissue culture flasks, centrifuged at 200 rcf and resuspended in RPMI medium (from Gibco) supplemented with 10% FBS and 1× Antibiotic-Antimycotic (from Gibco) at 10 million cells/mL cell density.

cPEG chamber synthesis: cPEG gel stock solution was prepared by dissolving cPEG macromonomer (1018, FIG. 10B) in PBS. To make 40 uL of the precursor solution, 6 uL of the cPEG stock solution was mixed with 2 uL of Polyethylene Glycol (PEG, 20 kDa) in PBS solution, 4 uL of Lithium phenyl-2,4,6-trimethylbenzoylphosphinate (LAP) in PBS solution, 4 uL cell suspension, and 24 uL PBS. The gel solution was loaded on a flow cell and single cells were caged using a Polygon 1000 DMD system (Mightex). The uncrosslinked polymer solution was then washed with PBS.

CD56-PE staining: The antibody solution was made with adding 5 uL of CD56-PE stock solution to 100 uL PBS. The antibody solution was then loaded on the flow cell and the flow cell was incubated at 37° C. Then the antibody solution was washed with PBS and the flow cell was incubated at 37°. Brightfield and green fluorescent images of cells were taken using 10 ms and 300 ms exposure time, respectively at 10× magnification.

cSEL chamber synthesis: cSEL gel stock solution was prepared by dissolving cSEL macromonomer (1020, FIG. 10B) in PBS. To make 40 uL of the precursor solution, 20 uL of the cSEL stock solution was mixed with 4 uL of Lithium phenyl-2,4,6-trimethylbenzoylphosphinate (LAP) in PBS solution, and 16 uL PBS. The gel solution was loaded on a flow cell, and selected cells were caged using the aforementioned DMD and illumination parameters. The uncrosslinked polymer solution was then washed with PBS.

cPEG gel lysis: 10 mM L-Glutathione (GSH) solutions in PBS was prepared and the pH was adjusted to 8.0 using sodium hydroxide. The GSH solution was loaded on the flow cell and the flow cell was incubated at room temperature for 5 minutes to lyse the cPEG gel. The flow cell was then washed three times with PBS.

cPEG secondary chamber synthesis: cPEG gel stock solution was prepared by dissolving cPEG macromonomer (1018, FIG. 10B) in PBS. Then, to make 40 uL of the precursor solution, 6 uL of the cPEG stock solution was mixed with 2 uL of Polyethylene Glycol (PEG, 20 kDa) in PBS solution, 4 uL of Lithium phenyl-2,4,6-trimethylbenzoylphosphinate (LAP) in PBS solution, and 28 uL PBS. The gel solution was loaded on a flow cell and selected cells were caged using the aforementioned DMD.

cSEL gel lysis: Alginate lyase was dissolved in PBS. The lyase solution was loaded on the flow cell and the flow cell was incubated at room temperature for 5 minutes to lyse the cSEL gel. The flow cell was then washed three times with PBS to remove the lyase solution.

In some embodiments, the above method for sorting cells by a plurality of optical criterion may be carried out in steps comprising: (a) synthesizing one or more first gel structures immobilizing one or more cells disposed on a surface of a channel and selected by a first optical characteristic; (b) synthesizing one or more second gel structures enclosing one or more cells immobilized by the first gel structures, wherein the one or more cells enclosed by the second gel structures are selected by a second optical characteristic; (c) degrading the first gel structures; and (d) removing cells freed by degrading the first gel structures so that the one or more cells selected by the first and second optical characteristic remain on the surface of the channel. In some embodiments, such steps may further comprise degrading the second gel structures and eluting the one or more cells selected by the first and second optical characteristics from the channel. In some embodiments, the first and second gel structures are orthogonally degradable; that is, a first gel structure may be degraded in the presence of a second gel structure without an appreciable effect on the second gel structures, and likewise, a second gel structure may be degraded in the presence of a first gel structure without an appreciable effect on the first gel structures. In some embodiments, a first gel structure and a second gel structure are orthogonally degradable by having different modes of degradability selected from the following: chemical degradability, for example, by the reduction of disulfide bonds, enzymatic degradability, degradability by temperature change, and photodegradability. In some embodiments, a plurality of optical characteristics for selecting subsets of cells in accordance with the above method comprises cell size, nucleus-to-cytoplasm size ratio, migration rate, motility, cell killing, cell shape, optical signal intensity monotonically related to surface protein expression, optical signal intensity monotonically related to protein secretion. In particular embodiments, a plurality of optical characteristics comprises migration rate and optical signal intensity monotonically related to surface protein expression. In particular embodiments, a plurality of optical characteristics comprises cell killing and optical signal intensity monotonically related to surface protein expression. Typically, such optical signal intensities may be produced by labeled antibodies specific for predetermined surface or secreted proteins. In some embodiments, optical intensity comprises fluorescence intensity.

Definitions

Unless otherwise specifically defined herein, terms and symbols of nucleic acid chemistry, biochemistry, genetics, and molecular biology used herein follow those of standard treatises and texts in the field, e.g. Kornberg and Baker, DNA Replication, Second Edition (W.H. Freeman, New York, 1992); Lehninger, Biochemistry, Second Edition (Worth Publishers, New York, 1975); Strachan and Read, Human Molecular Genetics, Second Edition (Wiley-Liss, New York, 1999); Abbas et al, Cellular and Molecular Immunology, 6$^{th}$ edition (Saunders, 2007).

"Assay," in some embodiments, refers to a process for detecting or measuring a cellular characteristic or property of single cells or of a population of cells. Typically process steps of an assay comprise a chemical, biochemical or molecular reaction (such as a cleavage of a bond, specific binding of complementary components, enzyme reactions, dissolution of complementary components, or the like) or a change of physical state (such as an increase or decrease in temperature, change in energy level, or the like) and result in the generation of a signal (or signals) from which the presence, absence or magnitude of a quantity related to a cell may be inferred. The nature of the signal produced by an assay may vary widely and can include, but is not limited to, an electrical signal, an optical signal, a chemical signal, or a material signal. A material signal comprises the production of a material that comprises information that can be extracted. For example, a material signal may be the amplification of a polynucleotide whose length, quantity, composition, or nucleotide sequence is indicative of a cellular characteristic. For example, a barcode oligonucleotide may be a material signal. Characteristics or properties of cells that are detected or measured may vary widely and include, but are not limited to, cytotoxicity, viability, proliferation capacity under selected conditions, size, shape, motility, types and profiles of cell surface, or cell membrane proteins, types and profiles of secreted proteins, production of metabolites, transcriptome, gene copy numbers, gene or allele identity, chromatin accessibility profiles, vector copy numbers for engineered or infected cells, and the like.

"Cells" refers to biological cells that may be assayed by methods and systems described herein comprise, but are not limited to, vertebrate, non-vertebrate, eukaryotic, mammalian, microbial, protozoan, prokaryotic, bacterial, insect, or fungal cells. In some embodiments, mammalian cells are assayed by methods and systems described herein. In particular, any mammalian cell which may be, or has been, genetically altered for use in a medical, industrial, environmental, or remedial process, may be analyzed by methods and systems described herein. In some embodiments, "cells" as used herein comprise genetically modified mammalian cells. In some embodiments, "cells" comprise stem cells. In some embodiments, "cells" refer to cells modified by CRISPR Cas9 techniques. In some embodiments, "cells" refer to cells of the immune system including, but not limited to, cytotoxic T lymphocytes, regulatory T cells, CD4+ T cells, CD8+ T cells, natural killer cells, antigen-presenting cells, or dendritic cells. Of special interest are cytotoxic T lymphocytes engineered for therapeutic applications, such as cancer therapy.

"Hydrogel" means a gel comprising a crosslinked hydrophilic polymer network with the ability to absorb and retain large amounts of water (for example, 60 to 90 percent water, or 70 to 80 percent) without dissolution due to the establishment of physical or chemical bonds between the polymeric chains, which may be covalent, ionic or hydrogen bonds. Hydrogels exhibit high permeability to the oxygen and nutrients, making them attractive materials for cell encapsulation and culturing applications. Hydrogels may comprise natural or synthetic polymers and may be reversible (i.e. degradable or depolymerizable) or irreversible. Synthetic hydrogel polymers may include polyethylene glycol (PEG), poly(2-hydroxyethyl methacrylate) and poly (vinyl alcohol). Natural hydrogel polymers may include alginate, hyaluronic acid and collagen. The following reference describe hydrogels and their biomedical uses: Drury et al, Biomaterials, 24: 4337-4351 (2003); Garagorri et al, Acta Biomatter, 4(5): 1139-1147 (2008); Caliari et al, Nature Methods, 13(5): 405-414 (2016); Bowman et al, U.S. Pat. No. 9,631,092; Koh et al, Langmuir, 18(7): 2459-2462 (2002).

"On demand" means an operation may be directed to individual, discrete, selected locations (e.g. a spatial location of polymer precursor solution; or a selected polymer matrix chamber). Such selection may be based on manual observation of optical signals or data collected by a detector, or such selection may be based on a computer algorithm operating on optical signals or data collected by a detector. Manual observation of optical signals or data collected by a detector can include either real-time detection or detection at a time period prior to modulating a unit of energy to polymerize polymer precursors or degrading a chamber. For example, a subset of chambers (all formed with photo-degradable polymer matrix walls) may be pre-selected for releasing and removing their contents based on position information and the values of optical signals from an analytical assay carried out in the chambers. The pre-selected chambers may be photo-degraded by selectively projecting a light beam of appropriate wavelength characteristics (for example, with the spatial energy modulating element) to degrade the polymer matrix walls of the pre-selected chambers. In another example, a plurality of chambers may be observed in real-time (e.g. via fluorescent microscopy) for detection of an analyte of interest and one or more chambers of the plurality of chambers is selected, in real-time, upon detection of the analyte of interest, for degradation.

"Polymer matrix" generally refers to a phase material (e.g. continuous phase material) that comprises at least one polymer. In some embodiments, the polymer matrix refers to the at least one polymer as well as the interstitial space not occupied by the polymer. A polymer matrix may be composed of one or more types of polymers. A polymer matrix may include linear, branched, and crosslinked polymer units. A polymer matrix may also comprise non-polymeric species intercalated within its interstitial spaces not occupied by polymer chains. The intercalated species may be solid, liquid, or gaseous species. For example, the term "polymer matrix" may encompass desiccated hydrogels, hydrated hydrogels, and hydrogels comprising glass fibers. A polymer matrix may comprise a polymer precursor, which generally refers to one or more molecules that upon activation can trigger or initiate a polymeric reaction. A polymer precursor can be activated by electrochemical energy, photochemical energy, a photon, magnetic energy, or any other suitable energy. As used herein, the term "polymer precursor" includes monomers (that are polymerized to produce a polymer matrix) and crosslinking compounds, which may include photo-initiators, other compounds necessary or useful for generating polymer matrices, especially polymer matrices that are hydrogels.

While preferred embodiments of the present invention have been shown and described herein, it will be obvious to those skilled in the art that such embodiments are provided by way of example only. It is not intended that the invention be limited by the specific examples provided within the specification. While the invention has been described with reference to the aforementioned specification, the descriptions and illustrations of the embodiments herein are not meant to be construed in a limiting sense. Numerous variations, changes, and substitutions will now occur to those skilled in the art without departing from the invention. Furthermore, it shall be understood that all aspects of the invention are not limited to the specific depictions, configurations or relative proportions set forth herein which depend upon a variety of conditions and variables. It should be understood that various alternatives to the embodiments of the invention described herein may be employed in practicing the invention. It is therefore contemplated that the invention shall also cover any such alternatives, modifications, variations or equivalents. It is intended that the following claims define the scope of the invention and that methods and structures within the scope of these claims and their equivalents be covered thereby.

What is claimed is:

1. A method of sorting a plurality of cells, comprising:
   (a) loading a fluidic device with the plurality of cells so that the plurality of cells are disposed on or adjacent to a surface of the fluidic device;
   (b) introducing one or more polymer precursors into the fluidic device;
   (c) selecting a subset of cells of the plurality of cells based on one or more optical signals from the subset of cells;
   (d) determining positions of the subset of cells in the fluidic device using a detector, wherein the detector is in optical communication with the fluidic device;
   (e) enclosing one or more cells of the subset of cells by synthesizing one or more gel structures in the fluidic device by projecting light into the fluidic device with a spatial energy modulating element such that the projected light causes polymerization of the one or more polymer precursors, thereby forming the one or more gel structures that enclose the one or more cells, wherein positions of the one or more gel structures in the fluidic device are determined by the positions of the subset of cells determined by the detector in (d);
   (f) removing from the fluidic device unselected cells of the plurality of cells;
   (g) performing an assay on the one or more cells enclosed in the one or more gel structures to obtain assay results for each of the one or more cells enclosed in the one or more gel structures; and
   (h) associating the assay results with the positions of the subset of cells determined in (d).

2. The method of claim 1, further comprising repeating the steps (a) through (f).

3. The method of claim 2, wherein the steps (a) through (f) are repeated until the one or more enclosed cells reach a predetermined density on the surface.

4. The method of claim 1, further comprising: selecting an additional subset of cells of the plurality of cells based on one or more additional optical signals from the additional subset of cells; determining positions of the additional subset of cells in the fluidic device using the detector; and enclosing one or more additional cells of the additional subset of cells by synthesizing one or more additional gel structures in the fluidic device enclosing the one or more additional cells of the additional subset of cells by projecting light into the fluidic device with the spatial modulating element such that the projected light causes polymerization of the one or more polymer precursors, thereby forming the one or more additional gel structures, wherein positions of the one or more additional gel structures in the fluidic device are determined by the positions of the additional subset of cells.

5. The method of claim 1, further comprising degrading at least a portion of the one or more gel structures that enclose the one or more cells and eluting the one or more cells from the fluidic device.

6. The method of claim 1, wherein the one or more optical signals are indicative of cell morphology, cell size, cell shape, organelle size, organelle shape, surface protein expression, cell motility, cellular migration rate, cellular replication rate, or protein secretion.

7. The method of claim 6, wherein the cellular replication rate is based on the one or more optical signals, and wherein the cellular replication rate is determined by: i) counting progeny of the one or more cells of the subset of cells, ii) dilution of an intracellular dye, or iii) a combination thereof.

8. The method of claim 1, wherein the one or more optical signals are indicative of protein secretion of the subset of cells.

9. The method of claim 8, wherein the protein secretion is cytokine secretion.

10. The method of claim 1, wherein the one or more optical signals are indicative of cellular migration rate.

11. The method of claim 10, wherein the cellular migration rate is determined by a series of images from which cellular positions are recorded as a function of time.

12. The method of claim 1, wherein the one or more optical signals are collected using the detector.

13. The method of claim 1, wherein the loading the fluidic device with the plurality of cells in (a) is simultaneous with the introducing the one or more polymer precursors into the fluidic device in (b).

14. The method of claim 1, wherein the one or more gel structures comprise photochemically degradable linkages.

15. The method of claim 1, wherein the one or more gel structures comprise chemically degradable linkages.

16. The method of claim 15, wherein the chemically degradable linkages comprise disulfide linkages.

17. The method of claim 1, wherein the one or more gel structures comprise a hydrogel chamber comprising an interior.

18. The method of claim 1, wherein the subset of cells are of a first cell type, and wherein the unselected cells are of a second cell type.

19. The method of claim 18, wherein the first cell type and second cell type are both immune cells.

20. A method of sorting a plurality of cells, comprising:
 (a) loading a fluidic device with the plurality of cells so that the plurality of cells are disposed on or adjacent to a surface of the fluidic device;
 (b) introducing one or more polymer precursors into the fluidic device;
 (c) selecting a subset of cells of the plurality of cells based on one or more optical signals from the subset of cells;
 (d) determining positions of the subset of cells in the fluidic device using a detector, wherein the detector is in optical communication with the fluidic device;
 (e) enclosing one or more cells of the subset of cells by synthesizing one or more gel structures in the fluidic device by projecting light into the fluidic device with a spatial energy modulating element such that the projected light causes polymerization of the one or more polymer precursors, thereby forming the one or more gel structures that enclose the one or more cells, wherein positions of the one or more gel structures in the fluidic device are determined by the positions of the subset of cells determined by the detector in (d), and wherein the one or more gel structures comprise photochemically degradable linkages; and
 (f) removing from the fluidic device unselected cells of the plurality of cells.

21. The method of claim 20, further comprising repeating the steps (a) through (f) until the one or more enclosed cells reach a predetermined density on the surface.

22. The method of claim 20, wherein the one or more optical signals are indicative of cell morphology, cell size, cell shape, organelle size, organelle shape, surface protein expression, cell motility, cellular migration rate, cellular replication rate, or protein secretion.

23. A method of sorting a plurality of cells, comprising:
 (a) loading a fluidic device with the plurality of cells so that the plurality of cells are disposed on or adjacent to a surface of the fluidic device;
 (b) introducing one or more polymer precursors into the fluidic device;
 (c) selecting a subset of cells of the plurality of cells based on one or more optical signals from the subset of cells;
 (d) determining positions of the subset of cells in the fluidic device using a detector, wherein the detector is in optical communication with the fluidic device;
 (e) enclosing one or more cells of the subset of cells by synthesizing one or more gel structures in the fluidic device by projecting light into the fluidic device with a spatial energy modulating element such that the projected light causes polymerization of the one or more polymer precursors, thereby forming the one or more gel structures that enclose the one or more cells, wherein positions of the one or more gel structures in the fluidic device are determined by the positions of the subset of cells determined by the detector in (d);
 (f) removing from the fluidic device unselected cells of the plurality of cells;
 (g) selecting an additional subset of cells of the plurality of cells based on one or more additional optical signals from the additional subset of cells;
 (h) determining positions of the additional subset of cells in the fluidic device using the detector; and
 (i) enclosing one or more additional cells of the additional subset of cells by synthesizing one or more additional gel structures in the fluidic device enclosing the one or more additional cells of the additional subset of cells by projecting light into the fluidic device with the spatial energy modulating element such that the projected light causes polymerization of the one or more polymer precursors, thereby forming the one or more additional gel structures, wherein positions of the one or more additional gel structures in the fluidic device are determined by the positions of the additional subset of cells.

24. The method of claim 23, wherein the one or more optical signals are indicative of cell morphology, cell size, cell shape, organelle size, organelle shape, surface protein expression, cell motility, cellular migration rate, cellular replication rate, or protein secretion.

25. The method of claim 23, wherein the loading the fluidic device with the plurality of cells in (a) is simultaneous with the introducing the one or more polymer precursors into the fluidic device in (b).

* * * * *